US012172176B2

(12) United States Patent
Earles et al.

(10) Patent No.: US 12,172,176 B2
(45) Date of Patent: Dec. 24, 2024

(54) BATTERY POWERED FLUID SPRAYER

(71) Applicant: Graco Minnesota Inc., Minneapolis, MN (US)

(72) Inventors: Jeffrey A. Earles, Lakeville, MN (US); Brian M. Mulgrew, St. Francis, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 703 days.

(21) Appl. No.: 17/177,750

(22) Filed: Feb. 17, 2021

(65) Prior Publication Data

US 2022/0105529 A1 Apr. 7, 2022

Related U.S. Application Data

(60) Provisional application No. 63/139,072, filed on Jan. 19, 2021, provisional application No. 63/086,454, filed on Oct. 1, 2020.

(51) Int. Cl.
*B05B 15/625* (2018.01)
*B05B 9/00* (2006.01)
*B05B 9/04* (2006.01)
*H01M 50/247* (2021.01)
*H01M 50/298* (2021.01)
*B05B 9/08* (2006.01)

(52) U.S. Cl.
CPC ............ *B05B 15/625* (2018.02); *B05B 9/007* (2013.01); *B05B 9/0413* (2013.01); *H01M 50/247* (2021.01); *H01M 50/298* (2021.01); *B05B 9/0861* (2013.01); *H01M 2220/30* (2013.01)

(58) Field of Classification Search
CPC ... B05B 15/625; B05B 9/0413; B05B 9/0861; B05B 9/007; H01M 50/247
USPC .................................................. 239/280–281
See application file for complete search history.

(56) References Cited

U.S. PATENT DOCUMENTS

| 5,752,661 | A | 5/1998 | Lewis |
| D440,477 | S | * 4/2001 | Pappas .............................. D8/71 |
| 8,596,555 | B2 | 12/2013 | Thompson et al. |
| 10,077,771 | B2 | * 9/2018 | Davidson ................ F04B 19/22 |
| 10,562,052 | B2 | 2/2020 | Fontaine |
| 2007/0278326 | A1 | * 12/2007 | Wu ........................ B05B 9/0861 239/332 |

(Continued)

FOREIGN PATENT DOCUMENTS

CN 102421533 A 4/2012
CN 111482293 A 8/2020

(Continued)

OTHER PUBLICATIONS

First Chinese Office Action for CN Application No. 202111149699.4, Dated Dec. 1, 2022, pp. 19.

(Continued)

*Primary Examiner* — Jason J Boeckmann
(74) *Attorney, Agent, or Firm* — Kinney & Lange, P. A.

(57) ABSTRACT

A fluid sprayer includes a battery supported by a stand of the sprayer and that is configured to provide electric power to a motor of the sprayer to cause pumping by a pump of the sprayer. The battery is mounted vertically below the sprayer body. The battery is bracketed by vertical portions of the stand.

23 Claims, 16 Drawing Sheets

(56) References Cited

U.S. PATENT DOCUMENTS

| | | | |
|---|---|---|---|
| 2011/0297756 A1* | 12/2011 | Peterson | B05B 9/01 |
| | | | 239/127 |
| 2016/0038960 A1 | 2/2016 | Fontaine | |
| 2018/0154386 A1 | 6/2018 | Zhang | |
| 2019/0072085 A1 | 3/2019 | Schultz | |
| 2021/0367305 A1* | 11/2021 | Wrobel | H01M 50/296 |
| 2022/0025882 A1 | 1/2022 | Horning et al. | |

FOREIGN PATENT DOCUMENTS

| | | |
|---|---|---|
| EP | 1863106 A1 | 12/2007 |
| JP | H0634950 A | 2/1994 |
| JP | 2004267883 A | 9/2004 |
| WO | 2020112809 A1 | 6/2020 |
| WO | 2022073170 A1 | 4/2022 |

OTHER PUBLICATIONS

Second Chinese Office Action for CN Application No. 202111149699.4, Dated May 24, 2023, pp. 20.
Extended European Search Report for EP Application No. 21197595.8, Dated Feb. 18, 2022, pp. 9.
Third Chinese Office Action for CN Application No. 202111149699.4, Dated Aug. 24, 2023, pp. 14.
First Communication Pursuant to Article 94(3) EPC for EP Application No. 21197595.8, Dated Apr. 18, 2024, pp. 4.
Fourth Chinese Office Action for CN Application No. 202111149699.4, Dated Jan. 18, 2024, pp. 4.

* cited by examiner

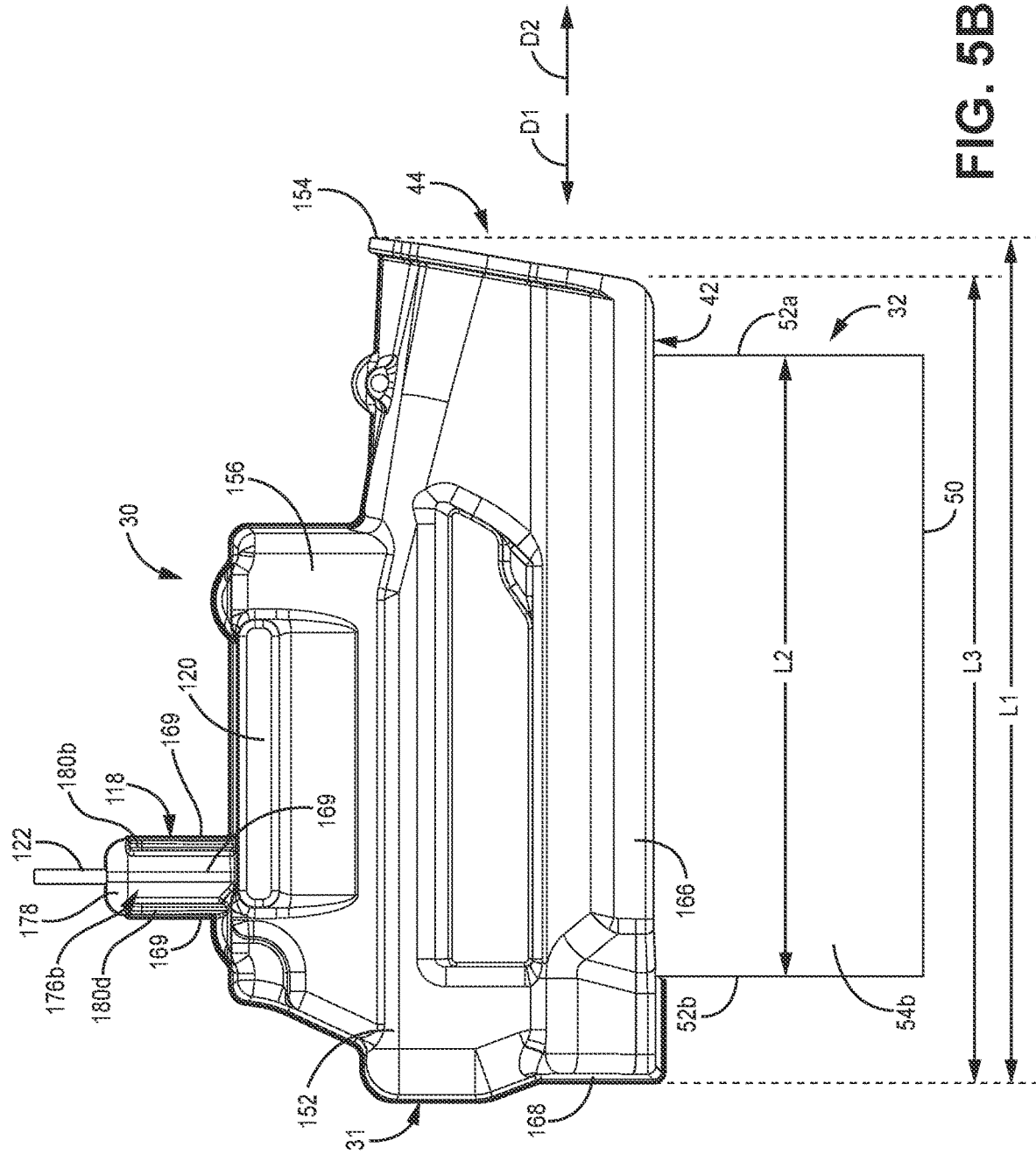

BATTERY POWERED FLUID SPRAYER

CROSS-REFERENCE TO RELATED APPLICATION(S)

This application claims the benefit of U.S. Provisional Application No. 63/086,454 filed Oct. 1, 2020, and entitled "BATTERY POWERED FLUID SPRAYER" and claims the benefit of U.S. Provisional Application No. 63/139,072 filed Jan. 19, 2021, and entitled "BATTERY POWERED FLUID SPRAYER."

BACKGROUND

The present disclosure relates generally to fluid sprayers. More specifically, the disclosure relates to battery powered fluid sprayers.

Sprayers apply fluid to a surface through a nozzle. A pump draws the spray fluid from a reservoir, pressurizes the fluid, and drives the fluid downstream to a spray gun where the fluid is emitted as a spray through the nozzle. The pump can be powered in various manners, such as electrically, pneumatically, or hydraulically. Electrically powered pumps typically receive AC power from a power cord connected to a wall outed to receive constant and unlimited electric power. Sprayers can be configured to spray various fluids such as paint, varnish, finishing, or other type of coating.

SUMMARY

According to an aspect of the present disclosure, a fluid sprayer includes a sprayer body; an electric motor located within the sprayer body; a piston pump operated by the electric motor to spray fluid; a stand supporting the sprayer body, the stand comprising at least two legs, the stand extending vertically below the sprayer body; and a battery mount holding a battery configured to provide power to the electric motor to power pumping by the pump. The battery mount is disposed vertically below the sprayer body and the battery mount positions the battery such that the battery is disposed vertically between an interface between the stand and the sprayer body and a ground interface of the stand when mounted to the battery mount.

According to an alternative or additional aspect of the present disclosure, a fluid sprayer includes a sprayer body; an electric motor located within the sprayer body; a piston pump operated by the electric motor to spray fluid; a stand supporting the sprayer body, the stand comprising a plurality of legs, the stand extending vertically below the sprayer body; and a battery mount holding a battery configured to provide power to the electric motor to power pumping by the pump. A first leg of the plurality of legs includes a curve between a vertically extending portion of the first leg and a horizontally extending portion of the first leg, and wherein the battery is framed by the curve of the first leg.

According to another alternative or additional aspect of the present disclosure, a fluid sprayer includes a sprayer body; an electric motor located within the sprayer body; a piston pump operated by the electric motor to spray fluid; a stand supporting the sprayer body, the stand comprising at least two legs, the stand extending vertically below the sprayer body; and a battery mount holding a battery configured to provide power to the electric motor to power pumping by the pump. The battery mount is disposed vertically below the sprayer body. The battery mount positions the battery such that the battery is disposed laterally between the at least two legs.

According to yet another alternative or additional aspect of the present disclosure, a fluid sprayer includes a sprayer body; an electric motor located within the sprayer body; a piston pump operated by the electric motor to spray fluid; a stand supporting the sprayer body, the stand comprising at least two legs, the stand extending vertically below the sprayer body; and a battery mount holding a battery configured to provide power to the electric motor to power pumping by the pump. The battery mount is disposed vertically below the sprayer body. The battery mount includes a chimney extending from a top side of the battery mount and into the sprayer body. Wires extend through the chimney into the sprayer body.

According to yet another alternative or additional aspect of the present disclosure, a battery mount for a fluid sprayer includes a mount body having a plurality of edges defining a receiving chamber, the receiving chamber having a front opening through which a battery enters into and exits from the receiving chamber to mount to and dismount from the battery mount, and defining a lower opening through which a portion of the battery projects when mounted to the battery mount; and a chimney extending from a top side of the mount body and away from the lower opening, the chimney including a wire opening disposed at a top end of the chimney opposite an end of the chimney interfacing with the mount body, and the chimney defining a wire passage between the end of the chimney interfacing with the mount body and the top end.

BRIEF DESCRIPTION OF THE DRAWINGS

FIG. 5B is a first side elevation view of the battery mount and battery.

DETAILED DESCRIPTION

This disclosure relates generally to battery powered fluid sprayers. The battery powered sprayer can spray various fluids, such as paint, varnish, finishing, or other type of coating. A battery provides electric power to an electric motor that powers a pump. The pump pumps fluid under pressure from a reservoir to a spray gun. The fluid is emitted under pressure from a nozzle of the spray gun as a fluid spray. The battery is mounted to an underside of the fluid sprayer to protect the battery from fluid particles that do not adhere to the target surface, which particles can be referred to as "overspray." The fluid particles fall through the atmosphere around the fluid sprayer and the battery is shielded from the overspray by portions of the fluid sprayer.

Figure 1A:
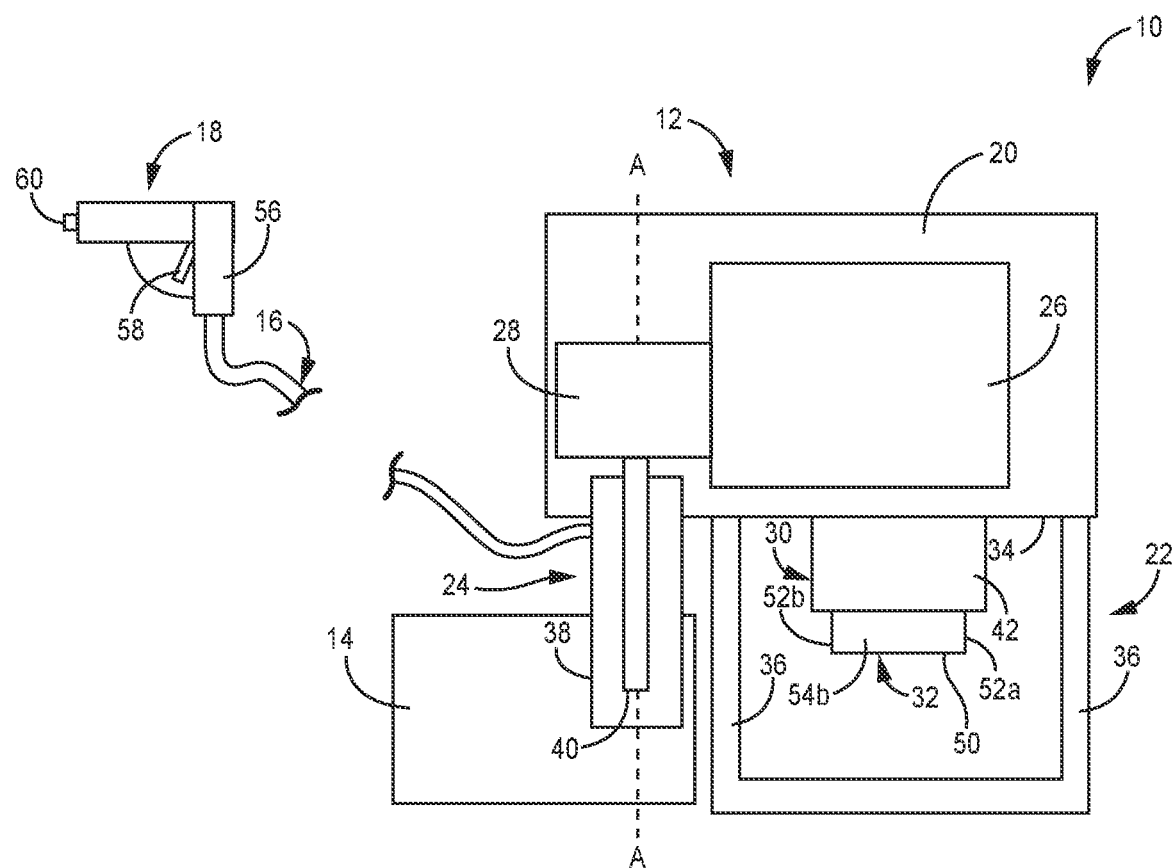
FIG. 1A is a side block diagram of a spray system.
Figure 1B:
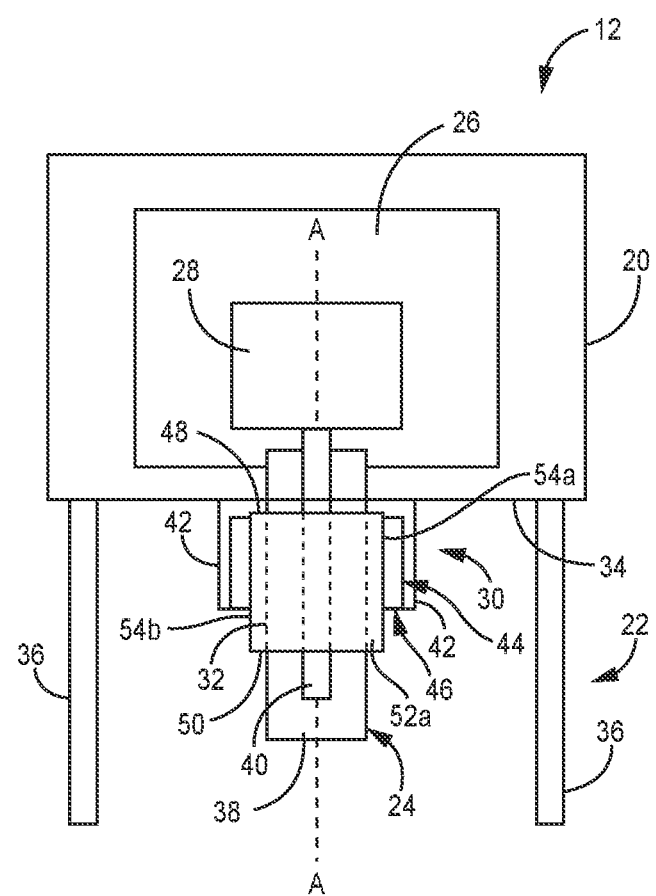
FIG. 1B is a rear block diagram of a fluid sprayer.

FIG. 1A is a side block diagram of spray system 10. FIG. 1B is a rear block diagram of fluid sprayer 12. FIGS. 1A and 1B will be discussed together. Spray system 10 includes fluid sprayer 12, reservoir 14, hose 16, and spray gun 18. Fluid sprayer 12 includes sprayer body 20, stand 22, pump 24, motor 26, drive 28, battery mount 30, and battery 32. Sprayer body 20 includes bottom side 34. Stand 22 includes support members 36. Pump 24 includes pump body 38 and piston 40. Battery mount 30 includes edges 42 defining mounting opening 44 and lower opening 46. Battery 32 includes top 48, bottom 50, longitudinal ends 52a, 52b, and lateral sides 54a, 54b. Spray gun 18 includes gun handle 56, trigger 58, and nozzle 60.

Fluid sprayer 12 is configured to draw a spray fluid from reservoir 14 and drive the spray fluid to spray gun 18 under pressure for spraying by spray gun 18. For example, the spray fluid can be a coating such as paint, varnish, finishing, or other type of coating. Fluid sprayer 12 can be an airless sprayer in that fluid sprayer 12 does not rely on pressurized air to shape or atomize the fluid spray. Instead, pump 24 generates sufficient pressure to cause nozzle 60 to atomize the fluid into the fluid spray.

Stand 22 supports other components of sprayer 12 relative to a support surface, such as a floor or the ground. Stand 22 is formed by one or more support members 36 that extend vertically relative to sprayer body 20 and contact the support surface. Support members 36 can be formed by legs, rails, etc. Support members 36 are shown as extending from sprayer body 20 proximate a front end of sprayer body 20 (the side including pump 24) and a rear end of sprayer body 20 opposite the front end. It is understood, however, that some examples of stand 22 include support members 36 extending from proximate the rear end of sprayer body 20 only. For example, support members 36 can include a vertically-extending portion extending from sprayer body 20 and a horizontal portion contacting the support surface. In some examples, stand 22 can include one or more wheels that contact the ground surface to facilitate moving of fluid sprayer 12 around a job site.

Sprayer body 20 is supported by stand 22 vertically above the support surface. Sprayer body 20 supports and can enclose one or more components of fluid sprayer 12. Pump 24 is supported by sprayer body 20. Pump 24 can be removably connected to sprayer body 20 such that pump 24 can be removed from fluid sprayer 12 for servicing, storage, replacement, etc. Pump body 38 is connected to sprayer body 20, such as by a clamp or interfaced threading, among other options. Piston 40 is at least partially disposed within pump body 38 and is configured to reciprocate to pump the spray fluid from reservoir 14 to spray gun 18. Pump 24 can be of any form suitable for pumping the fluid to spray gun 18 under pressure for spraying. In some examples, pump 24 is a double displacement pump such that pump 24 outputs fluid during both an up or suction stroke of piston 40 and a down or pressure stroke of piston 40.

Motor 26 is operatively connected to pump 24 to cause pumping by pump 24. Motor 26 is disposed within sprayer body 20. Motor 26 is an electric motor. For example, motor 26 can be a brushed or brushless direct current (DC) motor or alternating current (AC) induction motor, among other options. Motor 26 is operably connected to piston 40 to drive reciprocation of piston 40 along pump axis A-A to cause pumping by pump 24. Pump axis A-A can be a vertical axis, among other options. In the example shown, motor 26 and drive 28 cause reciprocation of piston 40. Drive 28 is at least partially disposed within sprayer body 20 and is configured to convert a rotational output from motor 26 into a linear reciprocating input to piston 40. Drive 28 can be of any form suitable for converting the rotational output to a linear reciprocating input, such as a cam, scotch yoke, or eccentric crank, among other options.

Battery mount 30 is supported by stand 22. For example, a portion of stand 22 can extend below sprayer body 20 and between battery mount 30 and sprayer body 20. In some examples, battery mount 30 can be directly connected to sprayer body 20 such that battery mount 30 is supported by stand 22 by way of sprayer body 20. Battery mount 30 extends away from a bottom side 34 of sprayer body 20. Battery mount 30 hangs vertically below bottom side 34 of sprayer body 20 such that battery mount 30 is disposed directly between sprayer body 20 and the support surface. Battery mount 30 is bracketed by support members 36 of stand 22. Battery mount 30 can be disposed laterally between support members 36 of stand 22 and/or battery mount 30 can be disposed longitudinally between support members of stand 22. Battery mount 30 can be oriented such that mounting opening 44 is disposed laterally and/or longitudinally between support members 36 to facilitate mounting of battery 32 and dismounting of battery 32. Battery mount 30 is disposed below sprayer body 20 such that sprayer body 20 shields battery mount 30 from falling fluid particles during spraying. Edges 42 of battery mount 30 define a cavity that battery 32 is mounted within to electrically connect battery 32 to motor 26. Edges 42 overhang the sides of battery 32 and extend vertically below the top edge of battery 32 and away from sprayer body 20 to shield battery 32 from falling fluid spray in the manner of an umbrella or awning.

Battery 32 is supported by stand 22. Battery 32 is connected to stand by battery mount 30. Battery 32 is directly connected to battery mount 30 and hangs vertically from battery mount 30 away from sprayer body 20. Battery 32 is configured to provide electrical power to motor 26 for operating pump 24. Battery 32 can be a lithium or other type of battery for providing the electrical power. Battery 32 is disposed on a lower side of fluid sprayer 12 and is spaced from bottom side 34 of sprayer body 20. Battery 32 is disposed vertically between the support surface and sprayer body 20. Battery 32 can be located laterally and/or longitudinally between the support members 36 forming stand 22.

Battery 32 can be slidably connected to battery mount 30. Battery 32 can be connected to battery mount 30 by sliding battery 32 onto battery mount 30 through mounting opening 44 to engage battery 32 with battery mount 30. Battery 32 can be removed from battery mount 30 by sliding battery 32 away from battery mount 30 and out through mounting opening 44. A portion of battery 32 hangs vertically below battery mount 30 through lower opening 46. Battery mount 30 is configured such that battery 32 can be removed from fluid sprayer 12 through an opening at least partially defined by support members 36. In the example shown, battery mount 30 is configured such that battery 32 is removed through a rear opening between support members 36 relative to fluid sprayer 12. Battery 32 is moved radially towards pump axis A-A during mounting. Battery 32 is moved radially away from pump axis A-A during removal. The rear opening is disposed opposite the front opening that is blocked by pump 24 with pump 24 mounted to sprayer body 20.

Battery 32 is enclosed within the chamber at least partially defined by edges 42 of battery mount 30. Top 48 of battery 32 is disposed fully within the chamber of battery mount 30. Battery 32 can be mounted to battery mount 30 such that only top 48 of battery 32 interfaces with battery mount 30. Top 48 of battery 32 is fully contained by battery mount 30 and covered by battery mount 30. Battery 32 hangs from battery mount 30 vertically away from sprayer body 20. As such, battery mount 30 is disposed directly between sprayer body 20 and battery 32. Longitudinal ends 52*a*, 52*b* of battery 32 extend through lower opening 46 of battery mount 30 such that each of longitudinal ends 52*a*, 52*b* are exposed outside of the mounting chamber. Longitudinal end 52*a* is oriented towards mounting opening 44 but mounting opening 44 is spaced longitudinally from longitudinal end 52*a* such that longitudinal end 52*a* is covered by the top of battery mount 30. Longitudinal end 52*a* does not contact battery mount 30. In some examples, each longitudinal end 52*a*, 52*b* is spaced from and does not contact battery mount 30. Each of longitudinal ends 52*a*, 52*b* are disposed partially within the chamber defined by battery mount 30. Lateral sides 54*a*, 54*b* of battery 32 extend through lower opening 46 of battery mount 30 and vertically out of the battery chamber.

Lateral sides 54*a*, 54*b* extend out of the chamber of battery mount 30 such that lateral sides 54*a*, 54*b* are partially covered by battery mount 30 and partially exposed outside of battery mount 30. Lateral sides 54*a*, 54*b* are each partially vertically overlapped by the lateral ones of edges 42. Lateral sides 54*a*, 54*b* are spaced from the walls of battery mount 30 such that neither lateral side 54*a*, 54*b* contacts battery mount 30.

Battery 32 is spaced from edges 42 of battery mount 30. Air gaps are formed between lateral sides 54*a*, 54*b* and edges 42 of battery mount 30. In some examples, an air gap is formed between longitudinal end 52*b* and the rear one of edges 42. Battery mount 30 thereby hangs over the edges of battery 32 to protect battery 32 from falling fluid particles. Lateral sides 54*a*, 54*b*; longitudinal ends 52*a*, 52*b*; and bottom 50 of battery 32 are exposed outside of the chamber defined by battery mount 30 for cooling and access. The edges 42 can project outward in the manner of an awning or umbrella to protect battery 32. Edges 42 of battery mount 30 being spaced from battery 32 further facilitates cooling and access and provides additional coverage area over battery 32 to protect battery 32 from fluid particles.

Battery 32 is mounted to fluid sprayer 12 to shield battery 32 from falling fluid particles. Battery 32 is bracketed by support members 36 such that stand 22 protects battery 32 from undesired contact. Battery 32 is thereby covered by sprayer body 20 and battery mount 30 and is bracketed by stand 22 to protect battery 32 from falling fluid particles and from undesired contact during operation and transport.

Spray gun 18 is configured to emit the spray fluid as an atomized fluid spray through nozzle 60. Trigger 58 is operatively connected to a valve (not shown) within spray gun 18 to open and close the flowpath through nozzle 60. The user can grasp gun handle 56 with a single hand and manipulate the orientation of spray gun 18 to aim spray gun 18. The user can actuate trigger 58 with the hand grasping gun handle 56 to control spraying by spray gun 18.

During operation, battery 32 provides electrical power to motor 26. Motor 26 generates a rotational output and provides that rotational output to drive 28. Drive 28 converts the rotational output from motor 26 into a linear reciprocating input to piston 40. Piston 40 reciprocates on pump axis A-A and pumps spray fluid from reservoir 14 to spray gun 18 through hose 16. The user actuates trigger 58 to open the valve in spray gun 18 and the spray fluid is emitted through nozzle 60 as an atomized fluid spray.

Figure 2A:
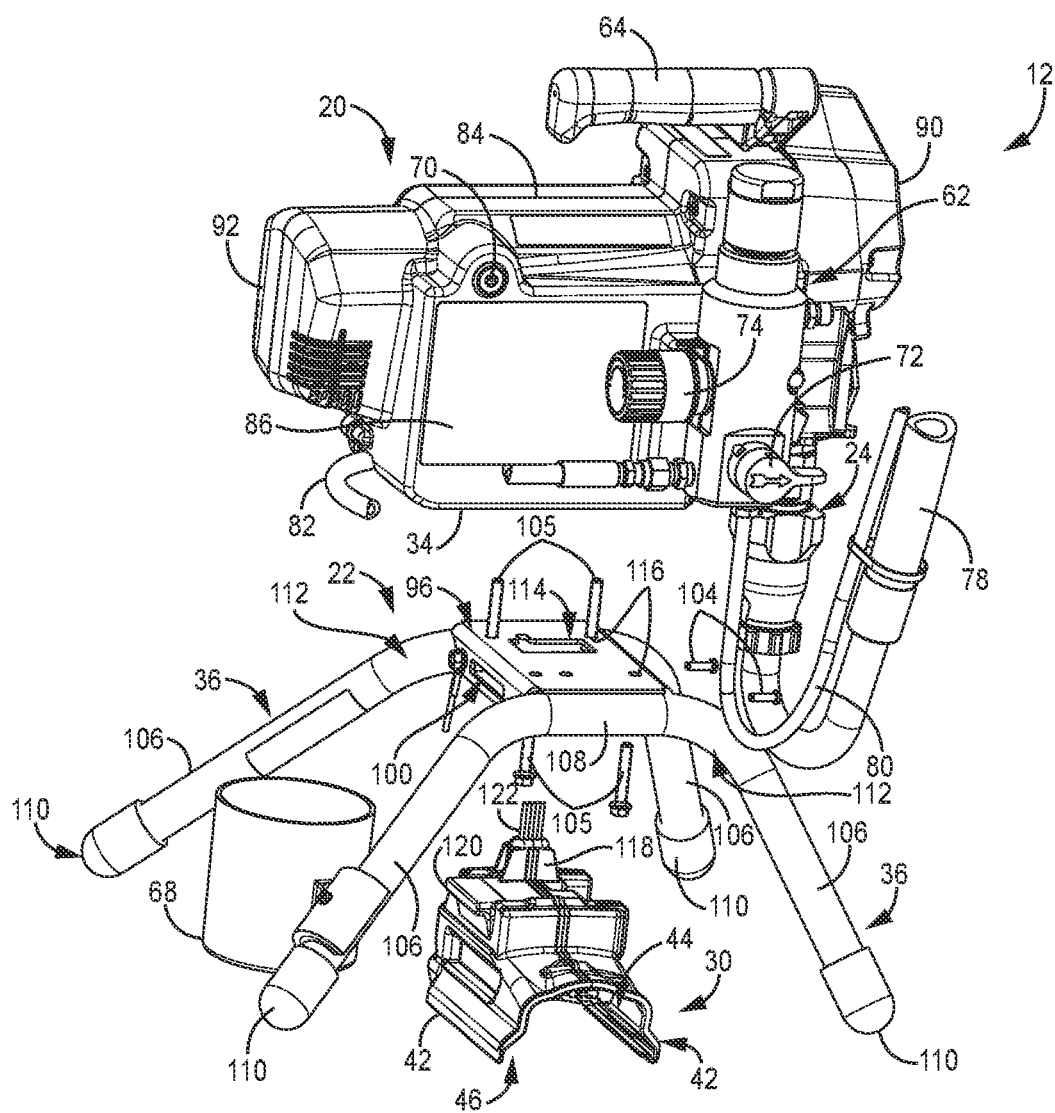
FIG. 2A is an isometric exploded view of a fluid sprayer.
Figure 2B:
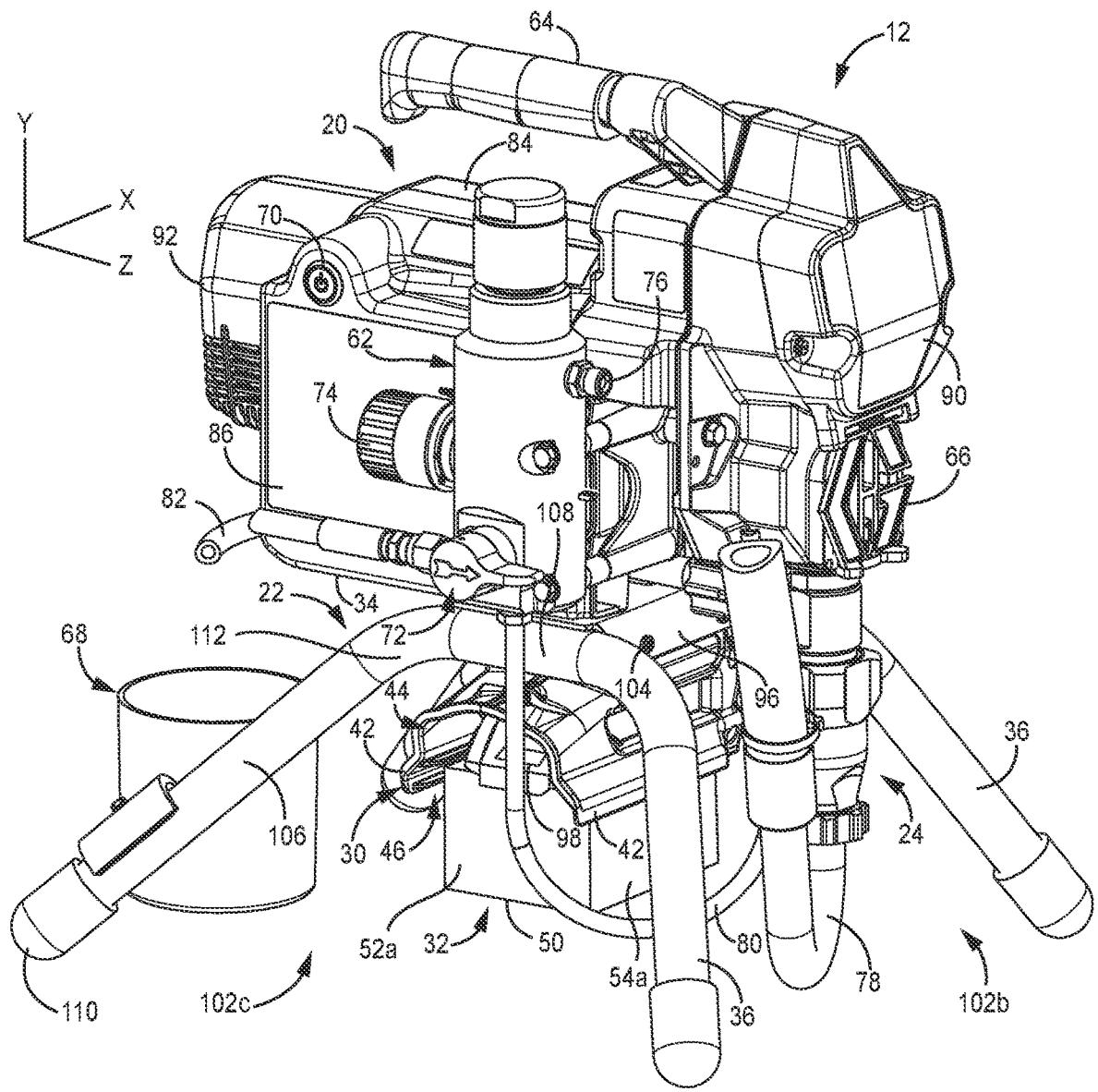
FIG. 2B is a first isometric view of a fluid sprayer.
Figure 2C:
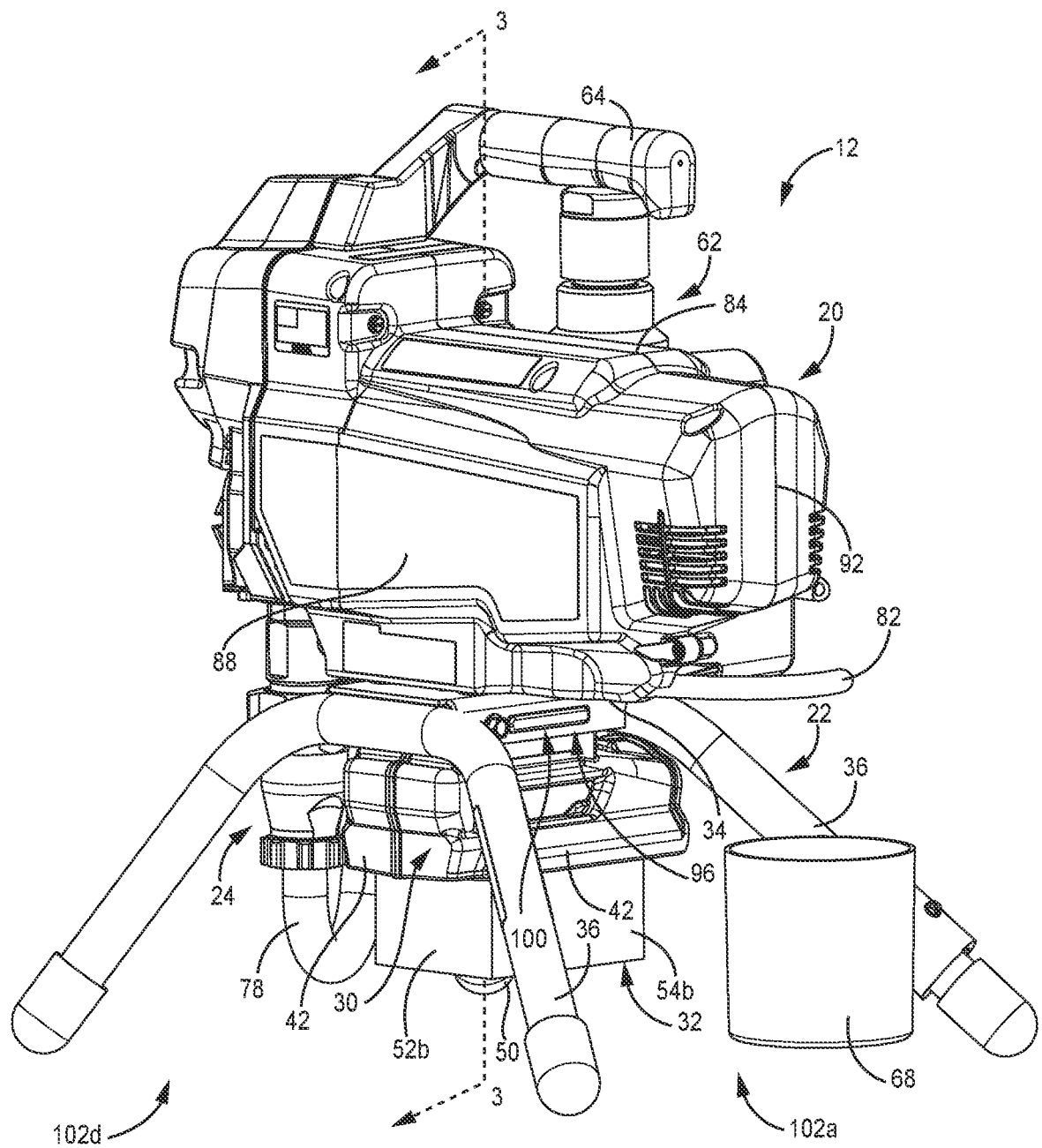
FIG. 2C is a second isometric view of the fluid sprayer.
Figure 2D:
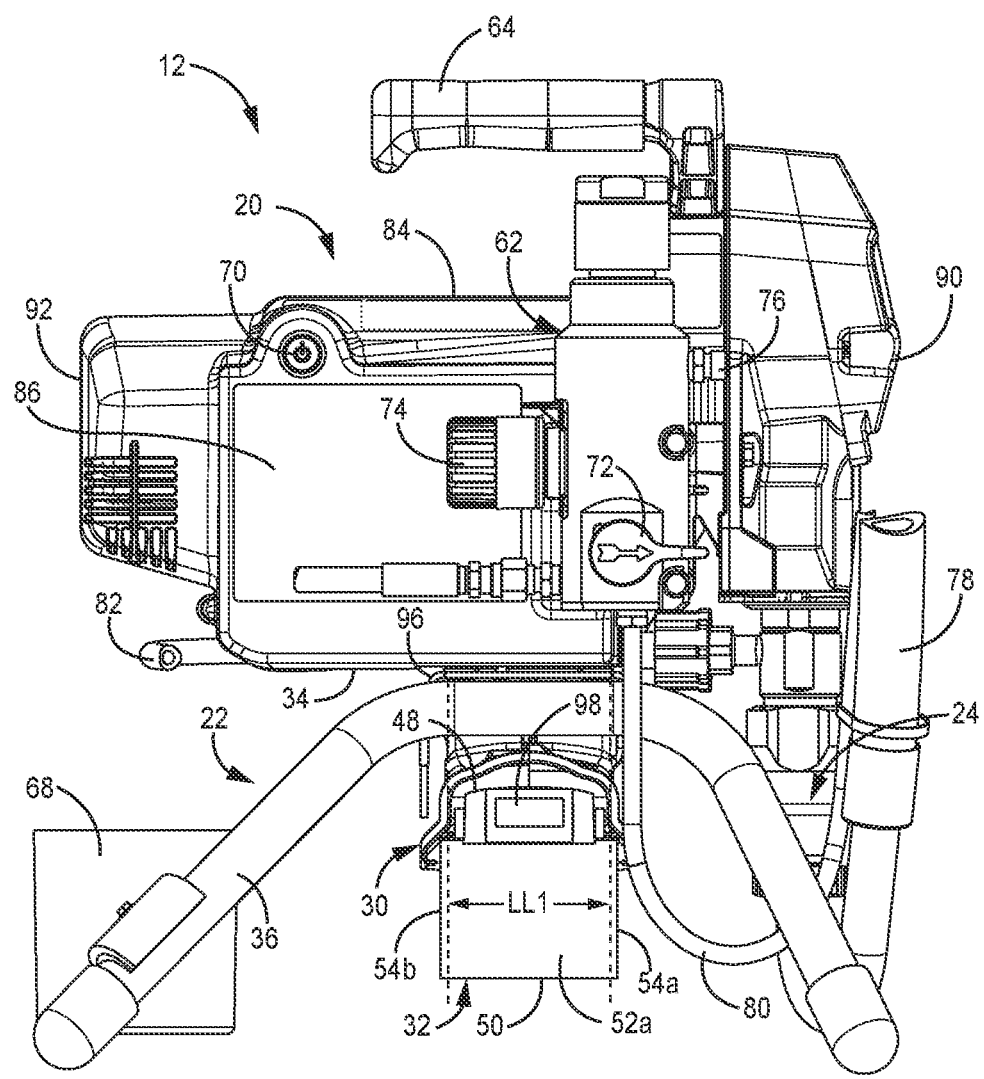
FIG. 2D is a side elevation view of the fluid sprayer.
Figure 2E:
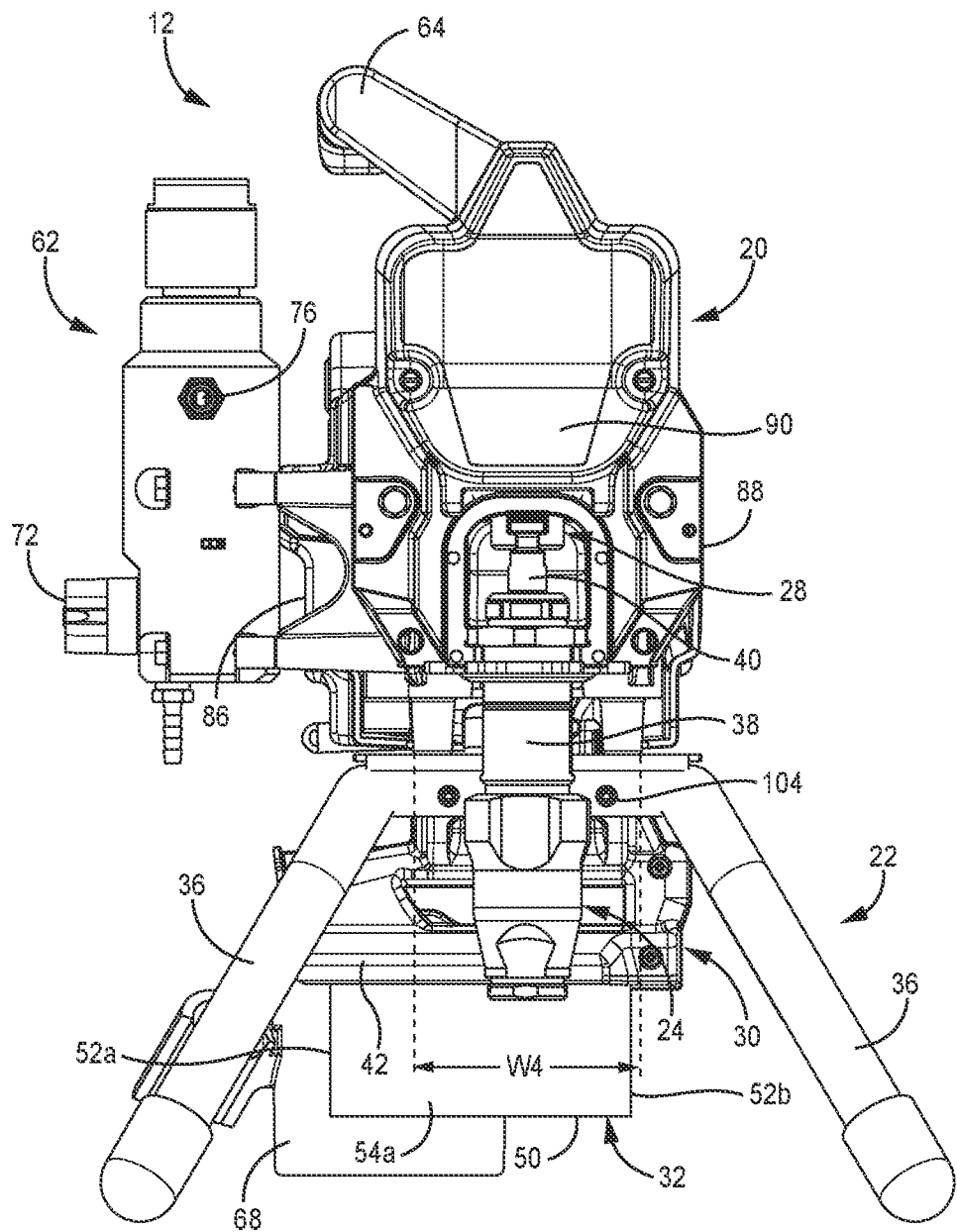
FIG. 2E is a front elevation view of the fluid sprayer.
Figure 2F:
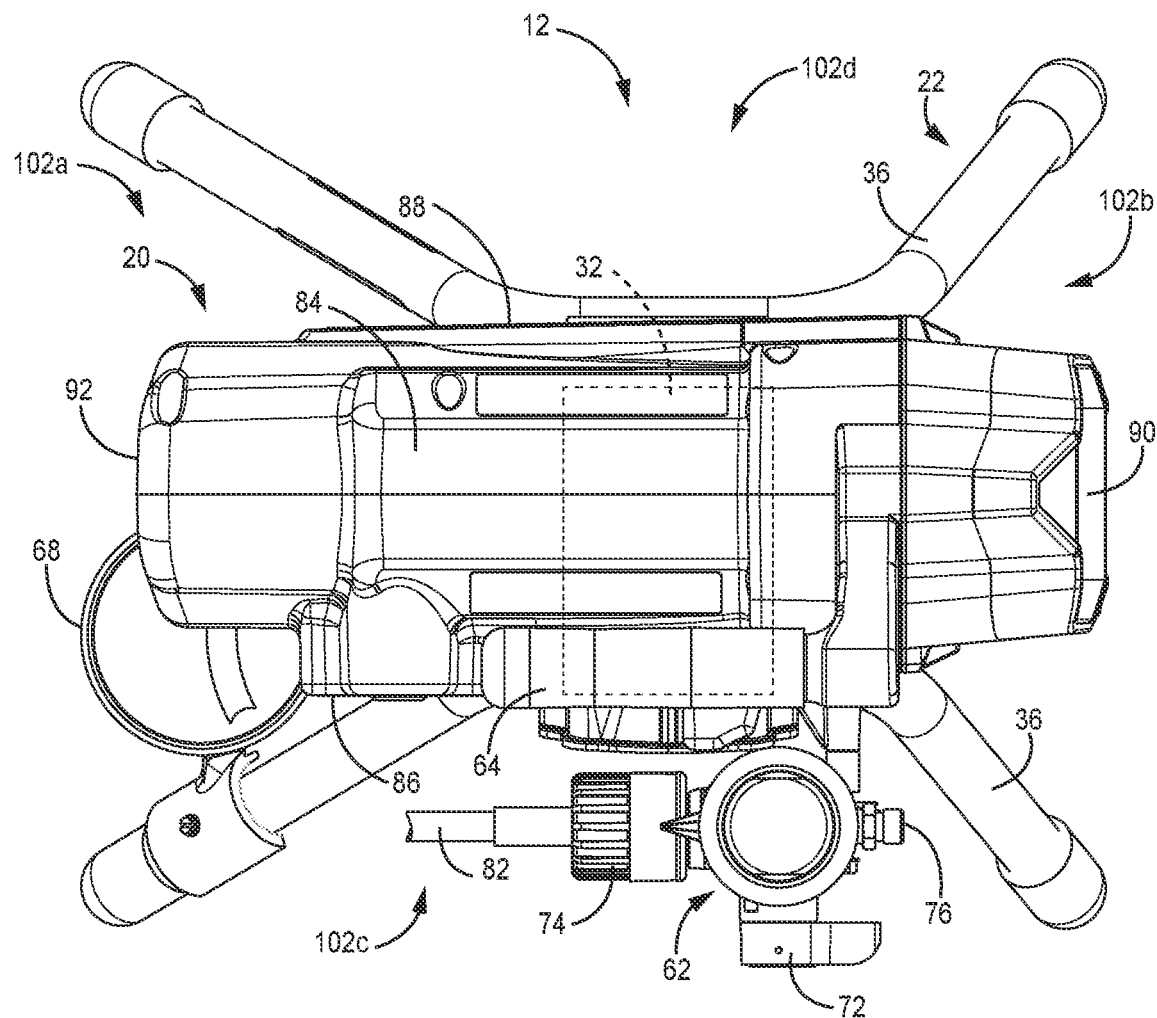
FIG. 2F is a top plan view of the fluid sprayer.

FIG. 2A is an exploded view of fluid sprayer 12. FIG. 2B is a first isometric view of a fluid sprayer 12. FIG. 2C is a second isometric view of the fluid sprayer 12. FIG. 2D is a side elevation view of the fluid sprayer 12. FIG. 2E is a front elevation view of the fluid sprayer 12 with a door removed to show an interface between piston 40 and drive 28. FIG. 2F is a top plan view of the fluid sprayer 12. FIGS. 2A-2F will be discussed together. Fluid sprayer 12 includes sprayer body 20, stand 22, pump 24, battery mount 30, battery 32 (FIGS. 2B-2F), control assembly 62, handle 64, door 66, cup 68, switch 70, prime valve 72, pressure control 74, fluid outlet 76, intake hose 78, drain hose 80, supply hose 82, mount fasteners 104, and sprayer fasteners 105. Sprayer body 20 includes bottom side 34, top side 84, first side 86, second side 88, front end 90, and rear end 92. Stand 22 includes support members 36 and base plate 96. Each support member 36 includes spacer portions 106, interface portions 108, and surface interfaces 110. Base plate 96 includes mounting slot 100, chimney opening 114, and spray fastener openings 116. Battery mount 30 includes edges 42 that define mounting opening 44 and lower opening 46, chimney 118, and projection 120. Battery 32 includes top 48; bottom 50; longitudinal ends 52*a*, 52*b*; lateral sides 54*a*, 54*b*; and release button 98.

Stand 22 supports other components of sprayer 12 on a support surface, such as the ground surface. Sprayer body 20 is supported by stand 22. Stand 22 includes a pair of support members 36 that each include a pair of legs extending to and interfacing with the support surface. It is understood, however, that support members 36 can be of any configuration suitable for supporting fluid sprayer 12 relative to the surface. Stand 22 can include as many or as few support members 36 as desired. For example, stand 22 can include one, two, three, four, or more support members 36. In the example shown, cup 68 is connected to one of the legs and is disposed in opening 102*a* defined between legs of the support members 36.

Spacer portions 106 of support members 36 extend vertically to space sprayer body 20 from the support surface. In the example shown, spacer portions 106 form the legs of support members 36. Surface interfaces 110 are portions of support members 36 that interface with the support surface. For example, surface interfaces 110 can interface with a ground surface and form a ground surface interface of the support members 36. In the example shown, surface interfaces 110 are formed at the distal ends of each leg formed by spacer portions 106 of the support members 36. It is understood, however, that support members 36 can be formed in any desired manner for interfacing with the support surface. For example, support members 36 can include rails for interfacing with the support surface.

Support members 36 are connected to base plate 96 at interface portions 108. Interface portions 108 are disposed at the interface between support members 36 and other components of fluid sprayer. In the example shown, interface portions 108 directly interface with base plate 96 to connect surface interfaces 110 to base plate 96. It is understood, however, that interface portions 108 can interface directly with sprayer body 20 in some examples. For example, each support member 36 can directly interface with sprayer body 20. Interface portions 108 are shown as disposed on the lateral sides 86, 88 of fluid sprayer 12, but it is understood that interface portions 108 can additionally or alternatively be disposed at the longitudinal front and rear ends 90, 92 of sprayer body 20.

Support members 36 can be include curves 112 to facilitate spacing of sprayer body 20 from the support surface. In the example shown, support members 36 are curved between interface portions 108 and surface interfaces 110. In some examples, support members 36 can be curved between a vertical component of surface interface 110 and a horizontal ground interface. Curves 112 are disposed at a main horizontal-vertical interface transition of support member 36. Battery 32 is framed by at least one substantial curve 112 of support members 36. In the example shown, curves 112 of each support member 36 frame battery 32. The battery 32 is framed such that the curvature of the support member 36 bends around battery 32 when viewed from the front, left, right, and/or rear elevation views of fluid sprayer 12. For example, a curve located between a leg extending vertically downward from the rear end 52 of sprayer body 20 and a ground interfacing portion extending to the left in FIG. 2D would not frame the battery 32. Conversely, a curve at the same interface but having a ground interfacing portion extending to the right in FIG. 2D does frame battery 32. In some examples, each curve 112 of a support member 36 frames battery 32.

Stand 22 supports battery mount 30. In the example shown, base plate 96 is configured to interface with and support battery mount 30. Base plate 96 interfaces with battery mount 30 to support battery mount 30, and thus battery 32, vertically below sprayer body 20. Base plate 96 interfaces with sprayer body 20 to support sprayer body 20 vertically above the support surface. Battery mount 30 is disposed on a first, lower side of base plate 96 and sprayer body 20 is disposed on a second, upper side of base plate 96. Base plate 96 directly interfaces with each of sprayer body 20 and battery mount 30.

Sprayer body 20 encloses and/or supports various other components of fluid sprayer 12. Sprayer body 20 is disposed over and can be connected to base plate 96. In the example shown, fasteners 105 extend through base plate 96 and into sprayer body 20 through fastener openings 116 to connect sprayer body 20 to stand 22. It is understood, however, that sprayer 12 can be connected to stand 22 in any desired manner. Handle 64 extends from top side 84 of sprayer body 20. More specifically, handle 64 extends from sprayer body 20 and can, in some examples, be formed by a portion of sprayer body 20, which portion can be integral with sprayer body 20. In the example shown, handle 64 is offset laterally (relative to sprayer body 20) towards first side 86 relative to pump axis A-A (as best seen in FIG. 2E). A user can grasp handle 64 to carry fluid sprayer 12.

Motor 26 (FIGS. 1A, 1B, and 3) is disposed within sprayer body 20. Drive 28 is at least partially disposed within sprayer body 20. Pump 24 is connected to sprayer body 20 such that pump 24 is supported by sprayer body 20. Pump 24 is at least partially disposed in opening 102b between legs of the support members 36. Pump 24 is connected to sprayer body 20 at front end 90 of sprayer body 20. Pump 24 connects to drive 28 by a dynamic interface within a chamber enclosed by door 66. Door 66 is movable to expose the chamber within which the dynamic connection is formed, to facilitate mounting of pump 24 to fluid sprayer 12 and removal of pump 24 from fluid sprayer 12. Pump body 38 extends vertically downward relative to sprayer body 20. Intake hose 78 extends from pump body 38 and is configured to extend into a reservoir, such as reservoir 14 (FIG. 1A) to fluidly connect pump 24 to the reservoir 14. Supply hose 82 extends from an outlet (not shown) of pump 24 to control assembly 62. Drain hose 80 extends from control assembly 62 and is configured to be placed within reservoir 14 to drain fluid to reservoir 14, such as during priming. Hose 16 (FIG. 1A) extends from fluid outlet 76 formed in control assembly 62 to a spray gun, such as spray gun 18 (FIG. 1A).

Switch 70 is formed on first side 86 of sprayer body 20. More specifically, switch 70 is formed on sprayer body 20. Switch 70 is configured to control the power of fluid sprayer 12 on and off. Control assembly 62 is supported by sprayer body 20. In the example shown, control assembly 62 is mounted to sprayer body 20. Control assembly 62 extends from a first side 86 of sprayer body 20. Prime valve 72 is supported by control assembly 62. Prime valve 72 is placed in a prime position to prime fluid sprayer 12 prior to spraying and is placed in a spray position to direct the spray fluid to fluid outlet 76 for spraying. A filter (not shown) can be disposed in control assembly 62. Pressure control 74 extends from control assembly 62. Pressure control 74 is used to control the pressure of the fluid provided downstream to spray gun 18. In the example shown, pressure control 74 is a knob that can be rotated to increase or decrease the output pressure.

Battery mount 30 is supported by stand 20. Battery mount 30 extends vertically relative to bottom side 34 of sprayer body 20. Battery 32 is supported by battery mount 30 vertically below sprayer body 20 and portions of stand 22. Battery mount 30 mounts to base plate 96 to protect electrical components of fluid sprayer 12. In the example shown, a portion of battery mount 30 extends through base plate 96 and into sprayer body 20 to route connectors 122 into sprayer body 20. Connectors 122 provide electrical and/or data communication connections between battery 32 and other electrical components of fluid sprayer 12. Connectors 122 exit from within battery mount 30 at a location disposed within sprayer body 20. The location where connectors 122 exit battery mount 30 is disposed on an opposite vertical side of base plate 96 from the location where battery 32 interfaces with battery mount 30. In the example shown, chimney 118 of battery mount 30 extends through chimney opening 114 and into sprayer body 20. Chimney 118 extends vertically from the top side of battery mount 30. Chimney opening 114 can fully surround the lateral sides and longitudinal sides of chimney 118. Chimney opening 114 extends vertically through base plate 96. In the example shown, fastener openings 116 also extend vertically through base plate 96. The chimney 118 forms an enclosed passage extending vertically from the battery mount 30 and into the sprayer body 20. The chimney 118 includes four sidewalls on all vertically extending sides of chimney 118, from the battery mount 30 into the sprayer body 20. While chimney has a rectangular cross-section taken orthogonal to a vertical axis, it is understood that the chimney 118 could instead be square, round, triangular, or have other cross-sectional shapes orthogonal to a vertical axis. The chimney 118 may be contiguously formed with the body of the battery mount 30, or may be formed separately.

Battery mount 30 is connected to base plate 96 at mounting slot 100 on a first side of base plate 96 and by fasteners 104 extending through base plate 96 and into battery mount 30 on a second side of base plate. The slot and fastener mounting arrangement provides tolerance at the mounting interface, facilitating mounting of battery mount 30 to sprayer body 20. In the example shown, projection 120 extends from battery mount 30 and is configured to be received within mounting slot 100. In some examples, a width of projection 120 (taken laterally relative to sprayer body 20 and longitudinally relative to battery mount 30 in FIGS. 2A-2D) can be less than the width of mounting slot 100 (taken laterally relative to sprayer body 20 and longitudinally relative to battery mount 30 in FIGS. 2A-2D). The disparate widths allow battery mount 30 to move relative to base plate 96 with projection 120 disposed in mounting slot 100 to align fastener openings on battery mount 30 with fastener openings through base plate 96 and facilitate fasteners 104 fixing battery mount 30 to base plate 96. While battery mount 30 is described as mounted to base plate 96 by a portion of battery mount 30 extending into mounting slot 100 and by fasteners 104, it is understood that battery mount 30 can be connected to sprayer body 20 in any desired manner. For example, battery mount 30 can be connected solely by fasteners, can be connected by clips, or can be connected by other one or more other connection types.

In the example shown, battery mount 30 is longitudinally rotated relative to sprayer body 30 in that battery mount 30 extends longitudinally in direction X while sprayer body 20 extends longitudinally in direction Z. Battery mount 30 extends laterally in direction Z while sprayer body 20 extends laterally in direction X. The longitudinal direction of battery 32 (along which battery 32 shifts to mount and dismount) is disposed transverse to the longitudinal direction of sprayer body 20. The longitudinal direction of battery 32 can be orthogonal to a longitudinal centerline of sprayer body 20. Battery mount 30 can be mounted such that the longitudinal direction of battery mount 30 is orthogonal relative to the longitudinal direction of sprayer body 30. While battery mount 30 is shown as longitudinally rotated relative to sprayer body 20 such that battery 32 is moved laterally relative to sprayer body 20 but longitudinally relative to battery mount 30 during installation and removal, it is understood that in some examples battery mount 30 is longitudinally aligned with sprayer body 20. In such an example, a ZY plane extends through mounting opening 44 and a rear one of edges 42 of battery mount 30 and through both of front end 90 and rear end 92 of sprayer body 20.

Battery 32 is supported by stand 22 and hangs vertically below bottom side 34 of sprayer body 20. More specifically, battery 32 is directly supported by battery mount 30 which battery mount 30 is directly supported by base plate 96. In the example shown, battery 32 is removably mounted to battery mount 30 such that battery 32 can be removed from fluid sprayer 12 for storage, charging, and/or replacement. Battery 32 can be mounted and dismounted through mounting opening 44 of battery mount 30. In the example shown, battery 32 is slidably mounted to battery mount 30. In the example shown, battery mount 30 is oriented such that battery 32 is inserted and removed through opening 102c between support members 36 of stand 22. Release button 98 can be accessed through mounting opening 44 to be actuated to disconnect battery 32 from battery mount 30 and allow for sliding removal of battery 32 out from underneath sprayer body 20. Battery 32 is inserted into battery mount 30 through mounting opening 44 of battery mount 30 and is removed from battery mount 30 through mounting opening 44. Edge 42 extends outward relative to longitudinal end 52a and is vertically disposed above battery 32 such that release button 98 is disposed within the battery receiving chamber 174 defined by battery mount 30.

Battery mount 30 partially encloses battery 32. Top 48 of battery 32 is fully covered by battery mount 30 to prevent falling fluid particles around fluid sprayer 12 from falling onto battery 32. Battery 32 extends through lower opening 46 of battery mount 30 such that battery mount partially covers the longitudinal end 52b and lateral sides 54a, 54b of battery 32. The bottom 50 of battery 32 is uncovered by battery mount 30. In the example shown, the interface between stand 22 and sprayer body 20 has a longitudinal length LL1 narrower than the width W3 (FIG. 5A) of battery 32. The longitudinal length LL1 is also narrower than the width W1 (FIG. 5A) of battery mount 30. In the example shown, the interface between stand and sprayer body 20 has a lateral width W4 that is narrower than the length L2 of battery 32. The lateral width W4 is also narrower than length L1 (FIG. 5B) of battery mount 30 and length L3 (FIG. 5B) of battery mount. Sprayer body 20 has a lateral width W4 greater than either the length L2 (FIG. 5B) or width W3 of battery 32. Sprayer body 20 has a longitudinal length greater than either the length L2 or width W3 of battery 32. Sprayer body 20 similarly has a lateral width and longitudinal length that are each greater than width W1 of battery mount and lengths L1, L3 of battery mount 30. All of the top of battery 32 is vertically covered by battery mount 30. In various examples, some or all of the top of battery 32 is vertically covered by both battery mount 30 and sprayer body 20.

Battery 32 is installed and removed from first side 86 of fluid sprayer 12, which is the same side of fluid sprayer 12 that the controls of fluid sprayer 12 are located on (e.g., switch 70, prime valve 72, pressure control 74). Such an arrangement simplifies user interaction with fluid sprayer 12 by allowing the user to insert, remove, and/or replace battery while also having access to the various controls of fluid sprayer 12 from the same user position. Battery 32 is described as being accessed through opening 102c. It is understood, however, that battery 32 can be mounted to fluid sprayer 12 in various orientations to be accessed from other sides of fluid sprayer 12. In some examples, battery mount 30 can disposed about 180-degrees around a vertical axis relative the orientation shown. In such an orientation, battery 32 can be accessed through opening 102d. In such an example, battery 32 can be accessed from second side 88 of sprayer 12. In other examples, battery mount 30 is oriented such that battery 32 is accessed through opening 102a between the rear ones of the legs of stand 22. In such an example, battery 32 can be pulled away from pump 24 during removal and can be moved towards pump 24 during installation. In some examples, battery 32 shifts axially along a radial line extending from the pump axis A-A during installation and removal. In such longitudinal mounting relative to sprayer body 20, cup 68 may be omitted or positioned at a different location on fluid sprayer 12 to facilitate access to battery 32 through opening 102a. Battery 32 can be accessed from rear end 92 of sprayer 12. Battery 32 can be mounted to fluid sprayer 12 and removed from fluid sprayer 12 while pump 24 remains attached to fluid sprayer 12.

Battery 32 is disposed vertically below sprayer body 20 to shield battery 32 from overspray. Battery 32 hangs beneath sprayer body 20 such that another component of fluid sprayer 12 is disposed vertically above battery 32 to shield battery 32. Battery mount 30 is disposed directly vertically above battery 32. Battery mount 30 is disposed directly between sprayer body 20 and battery 32 such that battery mount 30 vertically spaces battery 32 from sprayer body 20. Base plate 96 further spaces battery 32 vertically relative to sprayer body 20. Battery 32 is disposed vertically below the interface portions 108 of support members 36. Edges 42 of battery mount 30 form umbrella portions that project laterally and/or longitudinally relative to battery 32. The umbrella portions extend laterally and/or longitudinally to protect battery 32 from falling fluid spray. The umbrella portions extend relative to longitudinal ends 52a, 52b and lateral sides 54a, 54b and over those portions of battery 32 to protect battery 32 from falling fluid spray while leaving the longitudinal ends 52a, 52b and lateral sides 54a, 54b and the bottom of battery 32 at least partially exposed. The edges 42 are spaced from the longitudinal ends 52a, 52b and lateral sides 54a, 54b to allow airflow between battery 32 and battery mount 30 and facilitate cooling. The awnings formed by the edges 42 project outward relative to battery 32 and are disposed vertically over battery 32 to protect battery 32 from falling fluid spray.

In some examples, and as best seen in FIG. 2E, battery 32 is disposed fully underneath sprayer body 20 such that no portion of battery 32 projects beyond a perimeter of sprayer body 20. A footprint of sprayer body 20 is the area within the perimeter of sprayer body 20 when viewed from the top, as shown in FIG. 2E. Battery 32 can be fully disposed within the footprint of sprayer body 20 when mounted to fluid sprayer 12. Battery 32 is disposed laterally and/or longitudinally between the surface interfaces 110 of support members 36 relative to sprayer body 20, which surface interfaces 110 are configured to contact the support surface. The positioning of battery 32 on fluid sprayer 12 such that battery 32 is bracketed by support members 36 protects battery 32 from fluid during spraying and prevents unintentional contact of other objects (e.g., walls, corners, the user, etc.) with battery 32, such as when carrying fluid sprayer 12 via handle 64.

Fluid sprayer 12 provides significant advantages. Battery 32 provides electric power to motor 26 to cause pumping by pump 24, such that fluid sprayer 12 does not require an external power source, such as wall power. Fluid sprayer 12 can be utilized at locations where other power sources are inaccessible or inconvenient to operate Eliminating power cords also removes a trip hazard from the job site. Battery mount 30 connects battery 32 to fluid sprayer 12 and positions battery 32 vertically below fluid sprayer 12. Battery mount 30 covers the top of battery 32 to shield battery 32 from fluid particles in the atmosphere around fluid sprayer 12. Battery mount 30 extends outward relative to battery 32 to further protect battery 32 from falling fluid particles. Battery 32 being disposed vertically below fluid sprayer 12 further shields battery 32 from fluid falling around fluid sprayer 12. Battery 32 is disposed between legs of support members 36 (as best seen in FIGS. 2C and 2D) such that the legs prevent inadvertent contact with battery 32. The portions of battery 32 that are not enclosed by battery mount 30 are thereby protected from contact damage. Portions of battery 32 extend below battery mount 30 and are uncovered by battery mount 30 to facilitate user access to battery 32 and cooling of battery 32.

Figure 3A:
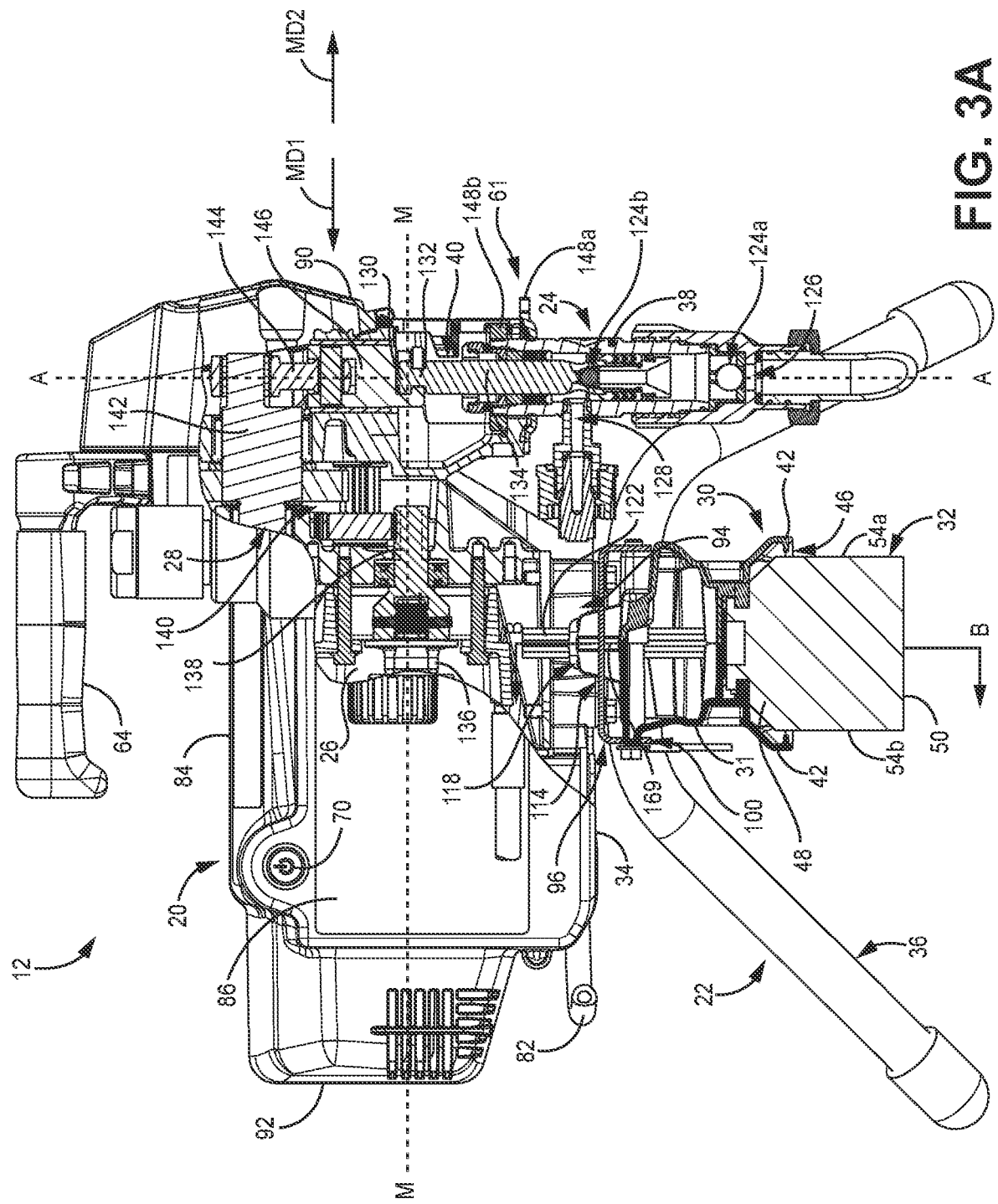
FIG. 3A is a partial cross-sectional view of the fluid sprayer taken along line 3-3 in FIG. 2B.
Figure 3B:
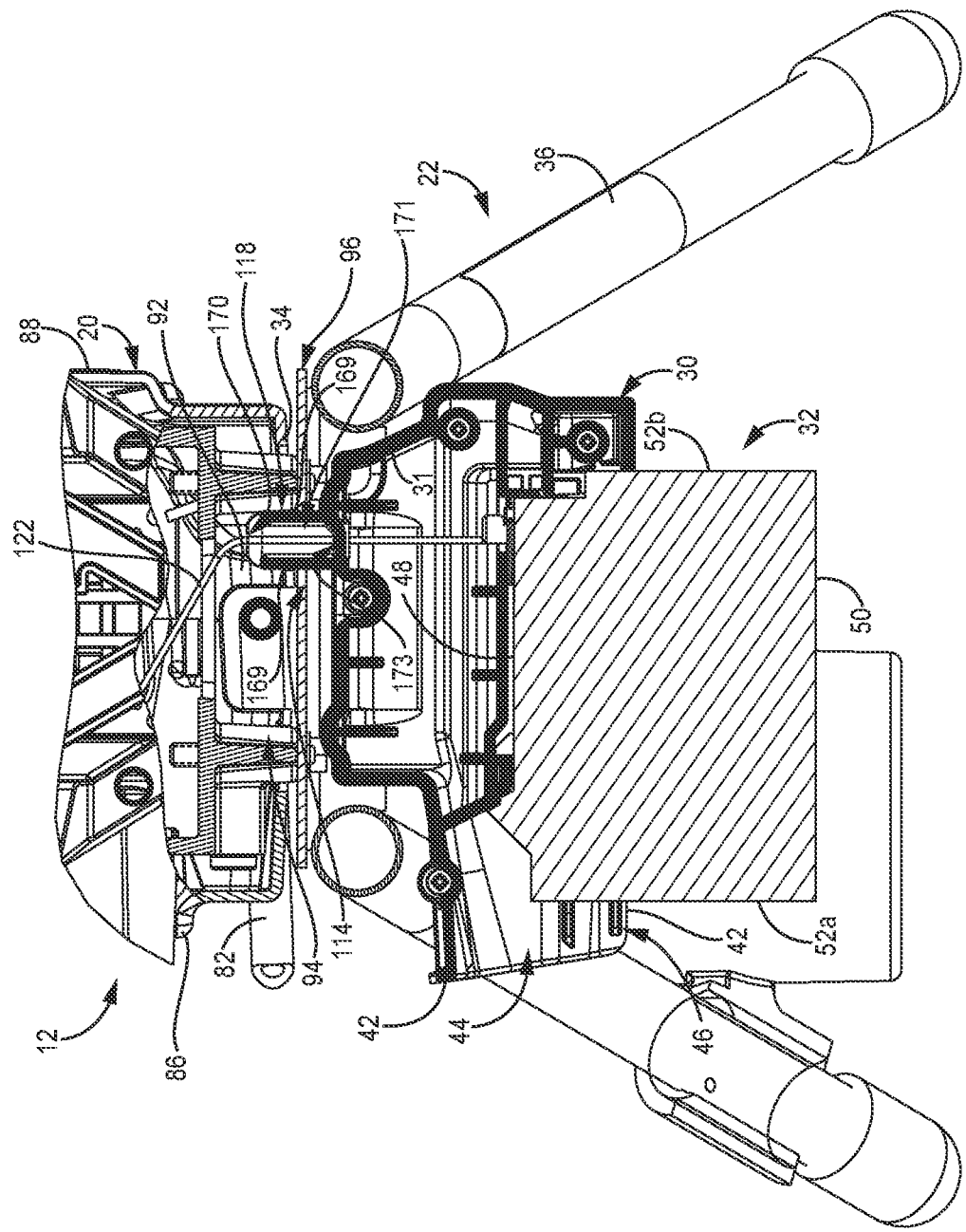
FIG. 3B is a partial cross-sectional view of the fluid sprayer taken along line B-B in FIG. 3A.

FIG. 3A is a partial cross-sectional view of fluid sprayer 12 taken along line 3-3 in FIG. 2C. FIG. 3B is a partial cross-sectional view of fluid sprayer 12 taken along line B-B in FIG. 3A. FIGS. 3A and 3B will be discussed together. Sprayer body 20, stand 22, pump 24, motor 26, drive 28, battery mount 30, battery 32, clamp 61, handle 64, switch 70, and supply hose 82 of fluid sprayer 12 are shown. Sprayer body 20 includes bottom side 34, top side 84, first side 86, second side 88, front end 90, rear end 92, and body cavity 94. Stand 22 includes support members 36 and base plate 96. Mounting slot 100 and chimney opening 114 of base plate 96 are shown. Pump 24 includes pump body 38, piston 40, check valves 124a, 124b, pump inlet 126, and pump outlet 128. Piston 40 includes head 130, neck 132, and piston body 134. Motor 26 includes motor body 136 and output shaft 138. Drive 28 includes gearing 140, eccentric 142, arm 144, and drive link 146. Mount body 31, edges 42, mounting opening 44, lower opening 46, and chimney 118 of battery mount 30 are shown. Chimney 118 includes chimney sides 169, wire opening 170, and chimney passage 171. Top 48; bottom 50; longitudinal ends 52a, 52b; and lateral sides 54a, 54b of battery 32 are shown.

Stand 22 supports other components of fluid sprayer 12. Sprayer body 20 directly interfaces with stand 22. Motive components of fluid sprayer 12 are supported by sprayer body 20 defining sprayer body 20. Each of motor 26, drive 28, and pump 24 are supported by sprayer body 20. Motor 26 is disposed within sprayer body 20. Motor body 136 is mounted to sprayer body 20. Motor shaft 138 is configured to rotate on motor axis M-M and provides the rotational output from motor 26. Motor 26 is disposed vertically above battery 32 and battery mount 30. Motor 26 can be disposed directly above battery 32 and/or battery mount 30 such that a vertical line passes through each of battery 32 and/or battery mount 30 and motor 26. In some examples, a vertical line can extend through battery 32, battery mount 30, base plate 96, and motor 26. Such a vertical line can be disposed parallel to the pump axis A-A.

Drive 28 is connected to motor 26 to receive the rotational output from motor 26. Gearing 140 interfaces with a pinion of motor shaft 138 to receive the rotational output from motor 26. Eccentric 142 is rotated by gearing 140 and drives reciprocation of drive link 146 via drive arm 144. As such, drive 28 can be considered to include a crank in the example shown.

Pump 24 is mounted to sprayer body 20. Pump 24 is mounted to fluid sprayer 12 by a static interface securing pump body 38 to sprayer body 20 and a dynamic interface between drive 28 and piston 40 to cause reciprocation of piston 40. In the example shown, clamp 61 forms the static connection with sprayer body 20. Clamp 61 is disposed on an exterior of pump body 38 and is configured to interface with sprayer body 20 to secure pump 24 to fluid sprayer 12. A portion of sprayer body 20 is received in a gap between rings 148a, 148b forming clamp 61. One or both of the rings 148a, 148b can be movable relative to pump body 38 to change a size of the gap and actuate the clamp 61 between an engaged state and a disengaged state. For example, ring 148a can be movable along pump axis A-A relative to pump body 38 and ring 148b can be statically connected to pump body 38. In some examples, one or both of the rings 148a, 148b can be connected to the pump body 38 by a threaded interface.

Piston 40 is at least partially disposed within pump body 38. Piston 40 interfaces with drive link 146 to be reciprocated by drive 28. Piston body 134 extends from within pump body 38 and out of pump body 38 through a first pump seal. A second pump seal forms a sealed interface between piston 40 and pump body 38. The second pump seal can be mounted to piston 40 to travel with piston 40 or can be disposed within pump body 38 at a fixed location such that piston 40 reciprocates relative to the second pump seal. The first and second pump seals can be considered to be dynamic seals due to relative movement at the seal interface. Piston 40 interfaces with the drive link 146 by a head and slot connection, though other connection types are possible, such as a pinned connection. Head 130 is received within a slot of drive link 146 and neck 132 connects head 130 and piston body 134. Head 130 has a larger diameter than neck 132. Piston body 134 can have a larger diameter than neck 132. Head 130 can be inserted into the slot through an opening oriented radially relative to pump axis A-A. Neck 132 extends through a lower opening of the slot oriented axially relative to pump axis A-A.

Check valve 124a is an inlet check valve that remains generally stationary, except for the moving valve member, relative to pump body 38 during operation. Check valve 124a is disposed proximate pump inlet 126. A valve member of check valve 124a moves to open and close the flowpath through check valve 124a but other components of check valve 124a do not move relative to pump body 38. Check valve 124b is operatively associated with piston 40 and reciprocates with piston 40 along axis A-A. Check valve 124b is disposed within piston 40. Each of check valves 124a, 124b are one-way valves that allow flow from upstream to downstream and prevent flow from downstream to upstream. Check valves 124a, 124b can be ball valves, among other options.

Pump 24 can be shifted longitudinally in direction MD1 from front end 90 towards rear end 92 to mount pump 24 to fluid sprayer 12. A portion of sprayer body 20 is received in the gap of clamp 61 and piston head 130 is received in the slot of drive link 146. Ring 148a of clamp 61 is tightened to place clamp 61 in the secured state and thereby secure pump 24 to housing 96. Pump 24 can be removed from sprayer body 20 by loosening ring 148a of clamp 61 and then pulling pump 24 in direction MD2 away from sprayer body 20. In the example shown, the directions MD1 and MD2 are transverse to the mounting direction D1 and removal directions D2 of battery 32 relative to battery mount 30, shown in FIG. 5C. It is understood, however, that in some examples the direction MD1 can be the same as the removal direction D2 of battery 32 and the direction MD2 can be the same as the mounting direction D1 of battery 32.

Sprayer body 20 is mounted to base plate 96 and supported by stand 22. Sprayer body 20 encloses various components of fluid sprayer 12. Sprayer body 20 encloses electrical components of fluid sprayer 12, such as a controller and motor 26, within body cavity 94. Battery mount 30 is mounted to base plate 96. Base plate 96 is disposed vertically between sprayer body 20 and battery mount 30. Battery mount 30 is disposed on a lower side of base plate 96. Battery 32 is mounted to and supported by battery mount 30. As shown, edges 42 of battery mount form awnings that are disposed over top side 48 of battery 32 and project outward and downward to partially cover lateral sides 54a, 54b of battery 32. Battery 32 hangs from battery mount 30. Battery mount 30 spaces battery 32 from stand 22 and sprayer body 20. Battery 32 hangs from battery mount 30 such that bottom side 50 of battery 32 is not directly supported by a structure that contacts the bottom side 50. Bottom side 50 is thus suspended. In some examples, the bottom side 50 of battery 32 does not contact anything, the bottom side 50 does not contact other components of fluid sprayer 12 and is suspended above the support or ground surface.

Chimney 118 forms a portion of battery mount 30 extending through base plate 96 and into sprayer body 20. Chimney 118 is sealed with the exterior of the body 31 of battery mount 30 such that fluid on the exterior of chimney 118 cannot enter into chimney 118 or into the interior of battery mount 30. For example, chimney 118 can be integrally formed with other portions of battery mount 30 to prevent any fluid from leaking therebetween and into the interior of battery mount 30, such as by the body 31 of battery mount 30 and chimney 118 being formed from contiguous material.

Chimney 118 extends vertically relative to the body 31 of battery mount 30 and into sprayer body 20. Chimney 118 extends vertically such that chimney 118 forms the uppermost portion of battery mount 30. The body of chimney 118 is formed by chimney sides 169. Chimney sides 169 extend vertically from the top of battery mount 30 such that chimney 118 is a vertical projection of battery mount 30. As discussed above, chimney sides 169 can be integrally formed with the body 31 of battery mount 30. Chimney 118 extends through chimney opening 114 formed in base plate 96. Chimney 118 projects vertically through base plate 96 and into the body cavity 94 defined by sprayer body 20. The interface between chimney 118 and the body 31 of battery mount 30 can be spaced vertically from base plate 96 such that a gap is formed therebetween. In the example shown, chimney 118 projects vertically upward beyond bottom side 34 of sprayer body 20 such that the wire opening 170 is disposed within the body cavity 94 of sprayer body 20.

Chimney 118 routes connectors 122 to provide electrical and/or data communication connections between battery 32 and other electrical components of fluid sprayer 12. Connectors 122 exit from chimney 118 at a location disposed within the body cavity 94 of sprayer body 20. The location where connectors 122 exit battery mount 30 can be disposed directly vertically below components of motor 26, minimizing the lengths of wire from battery 32.

Chimney passage 171 is formed within chimney 118. Chimney passage 171 is a vertically oriented passageway that is defined by the vertical walls forming chimney sides 169. Chimney passage 171 has wire opening 170 at a vertical top end that providers a location for connectors 122 to exit from battery mount 30 and into sprayer body 20. Chimney passage 171 is oriented along a vertical axis. Chimney passage 171 is elongate along an axis. The axis of chimney passage 171 can be orthogonal to the motor axis M-M. The axis through the chimney passage 171 can be parallel to the pump axis A-A. Wire opening 170 is formed through the portion of chimney 118 spaced furthest from the body 31 of battery mount 30. Wire opening 170 is formed at the uppermost portion of battery mount 30. Wire opening 170 being formed at the uppermost portion of battery mount 30 positions wire opening 170 within sprayer body 20 to ensure that connectors 122 are not exposed at locations outside of sprayer body 20. Connectors 122 are thereby disposed within at least one of battery mount 30 and sprayer body 20 along the full lengths of the connectors 122. Chimney passage 171 has an opening 173 at a vertical bottom end, proximate the interface of chimney 118 and body 31, to form a second wire opening 173. The second wire opening 173 provides a location for connectors 122 to enter into chimney passage 171 from within body 31 of battery mount 30.

Chimney passage 171 can be a straight passage without bends between the upper wire opening 170 and the lower wire opening 173 at body 31. Chimney passage 171 being straight facilitates easy routing of connectors 122 and allows for use of shorter length connectors 122. Chimney passage 171 is enclosed between the two end openings 170, 173. In some examples, walls 169 are continuous between the base and tip of chimney 118 such that chimney passage 171 does not include any laterally or longitudinally oriented openings. Having chimney 118 formed by continuous walls with only the upper and lower openings 170, 173 inhibits fluid migration and protects the electronic components from that fluid.

Chimney sides 169 extend vertically from the body 31 of battery mount 30 through base plate 96 and through bottom side 34 of sprayer body 20. Chimney 118 extending through base plate 96 and bottom side 34 positions wire opening 170 within sprayer body 20 and vertically above bottom side 34. As such, wire opening 170 is positioned vertically above the floor of sprayer body 20 formed by bottom side 34. Positioning wire opening 170 vertically above that floor and within the body cavity 94 of sprayer body 20 protects the electrical components of battery 32 from fluid. Wire opening 170 is positioned such that any fluid that may pool within the sprayer body on bottom side 34 is disposed vertically below wire opening 170. As such, gravity pulls the fluid away from wire opening 170. Wire opening 170 is positioned to prevent that fluid from entering into battery mount 30. The sealed interface between chimney 118 and the body of battery mount 30 also inhibits fluid migration and protects the electrical components.

Wire opening 170 is disposed within the body cavity 94 of sprayer body 20 such that sprayer body 20 protects the electrical connections by shielding wire opening 170 from falling fluid spray. Wire opening 170 is disposed vertically between top side 84 and bottom side 34. Wire opening 170 is disposed directly between top side 84 and bottom side 34. Wire opening 170 is disposed between first side 86 and second side 88. Wire opening 170 is disposed directly between first side 86 and second side 88. Wire opening 170 is disposed between front end 90 and rear end 92. Wire opening 170 can be disposed directly between front end 90 and rear end 92. Wire opening 170 can be positioned directly between the walls of the sprayer body 20 that form the front end 90 and the rear end 92. Positioning wire opening 170 within the body cavity 94 of sprayer body 20 protects wire opening 170 from falling fluid spray.

During operation, battery 32 provides electric power to motor 26 to power motor 26. Motor 26 outputs rotational motion by motor shaft 138 and powers drive 28. Drive 28 converts the rotational motion to reciprocating motion along axis A-A. Motor axis M-M is oriented transverse to an orientation of pump axis A-A and, in some examples, such orientations can be orthogonal. In some examples, motor axis M-M directly intersects with pump axis A-A.

Piston 40 reciprocates vertically along pump axis A-A through respective up or suction strokes and down or pump strokes. In the example shown, pump 24 is a double displacement pump that outputs fluid during each of the up and down strokes. During the upstroke, check valve 124b closes and check valve 124a opens. Spray fluid is drawn into the upstream chamber between check valve 124a and check valve 124b and is output from a downstream chamber downstream of check valve 124b through pump outlet 128. The downstream chamber is formed between piston body 134 and pump body 38. After completing the upstroke, drive 28 changes over and piston 40 is driven through the downstroke. During the downstroke, check valve 124a closes and check valve 124b opens. Spray fluid is driven from the upstream chamber to the downstream chamber through check valve 124b and is driven downstream from the downstream chamber through pump outlet 128.

Fluid sprayer 12 provides significant advantages. Battery 32 is at least partially vertically aligned with motor 26, providing for a compact arrangement allowing for use at various locations across a variety of spray environments. Battery mount 30 extends from outside of sprayer body 20, through base plate 96, and vertically through bottom side 34 of sprayer body 20 into the body cavity 94 defined by sprayer body 20. More specifically, chimney 118 extends into the body cavity 94 of sprayer body 20 such that wire opening 170 is disposed vertically above the floor of the body cavity 94, which floor is formed by bottom side 34. Positioning wire opening 170 vertically above the floor formed by bottom side 34 protects electrical components from fluid that may enter into sprayer body 20 and pool on the floor. Wire opening 170 being disposed within the body cavity 94 of sprayer body 20 further prevents falling fluid from reaching wire opening 170 because the fluid encounters sprayer body 20 before the fluid can fall to wire opening 170. Chimney 118 is sealed with the body 31 of battery mount 30 (e.g., by being integrally formed therewith) to prevent fluid migration into the interior of either of chimney 118 or battery mount 30. Connectors 122 can be relatively short because battery 32 is disposed in close proximity to motor 26. Eliminating excess wire reduces material use and reduces the lengths of flexible components, providing a robust sprayer arrangement. The short distance between the location where connectors 122 exit battery mount 30 facilitates the compact configuration of fluid sprayer 12. Battery 32 is disposed vertically below sprayer body 20 and battery mount 30 to shield battery 32 from falling fluid spray. Fluid sprayer 12 can be utilized in various environments where power is not readily available. Battery 32 can be easily removed and swapped for another battery 32 to continue spraying even when a battery 32 loses power.

Figure 4:
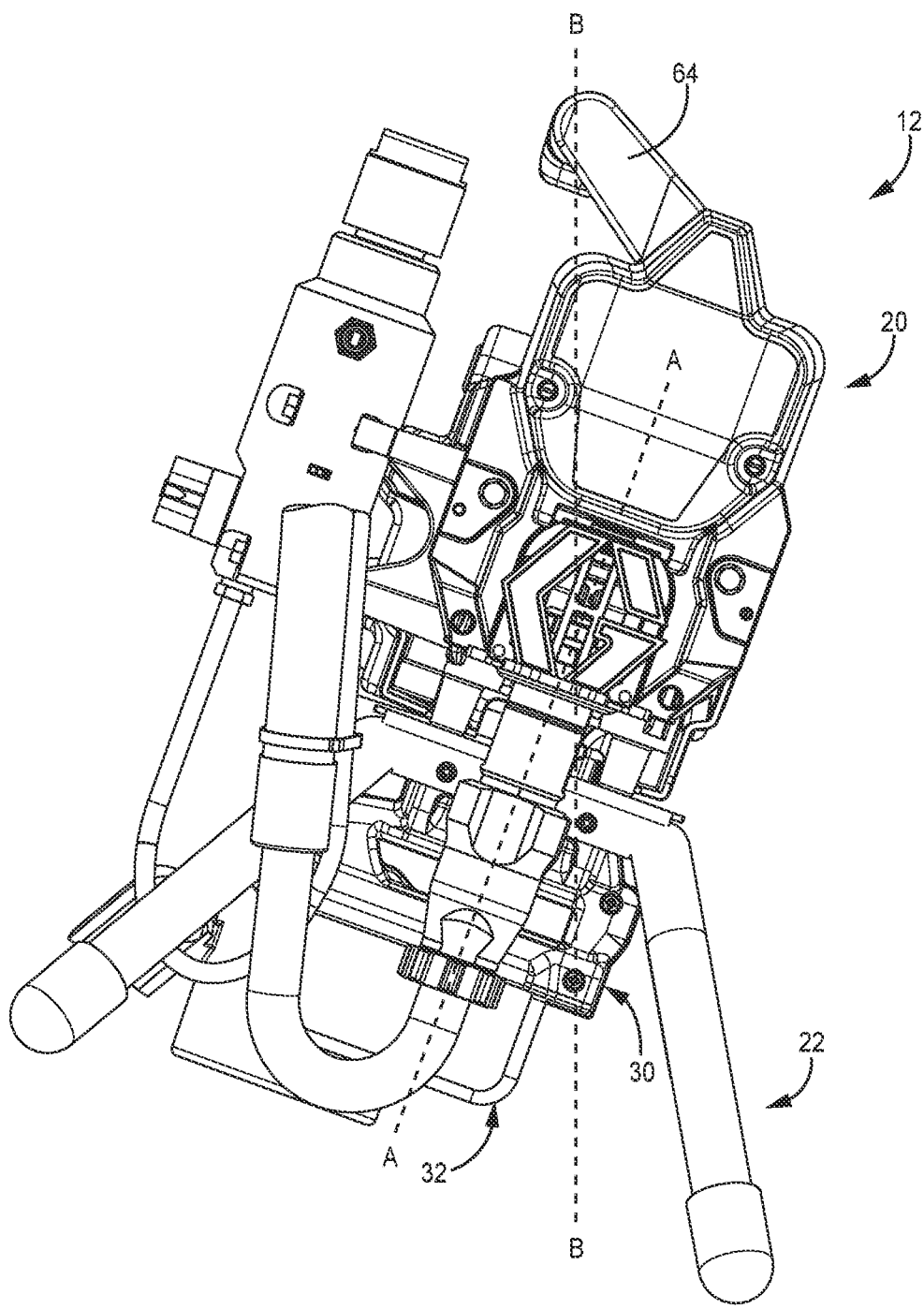
FIG. 4 is a front elevation view of a fluid sprayer in a hanging orientation.

FIG. 4 is a front elevation view of fluid sprayer 12 showing fluid sprayer 12 in a hanging orientation. Fluid sprayer 12 is shown in the orientation that fluid sprayer 12 is in when fluid sprayer 12 is carried by a user grasping handle 64. Axis B-B is a vertical axis that extends through a center of gravity of fluid sprayer 12. Axis B-B is canted relative to axis A-A, which is vertically oriented when fluid sprayer 12 is supported by stand 22 on the surface. Axis B-B extends through battery mount 30. In some examples, axis B-B can extend through battery 32. A plane on axis B-B and extending longitudinally relative to fluid sprayer 12 (i.e., normal to the view shown in FIG. 3) extends through battery mount 30 and can extend through battery 32. Axis A-A is transverse to such a plane. Battery 32 is disposed vertically below sprayer body 20 during carrying of fluid sprayer 12, preventing undesired contact to battery 32.

Handle 64 is laterally offset from a plane on axis A-A and that extends longitudinally relative to fluid sprayer 12 (i.e., normal to the view shown in FIG. 3). Battery 32 and battery mount 30 lower the center of gravity to cause fluid sprayer 12 to swing to the position shown in FIG. 4 while fluid sprayer 12 is being carried by handle 64. The lower center of gravity removes portions of stand 22 from the walking path of the user. The lower center of gravity positions portions of battery mount 30 and sprayer body 20 between the user and battery 32. With axis B-B defining a vertical axis, battery mount 30 is positioned such that a horizontal plane extends through both battery mount 30 and portions of battery 32 disposed outside of the chamber defined by battery mount 30. The lower center of gravity facilitates ease of transport and shields battery 32 from undesired contact.

Figure 5A:
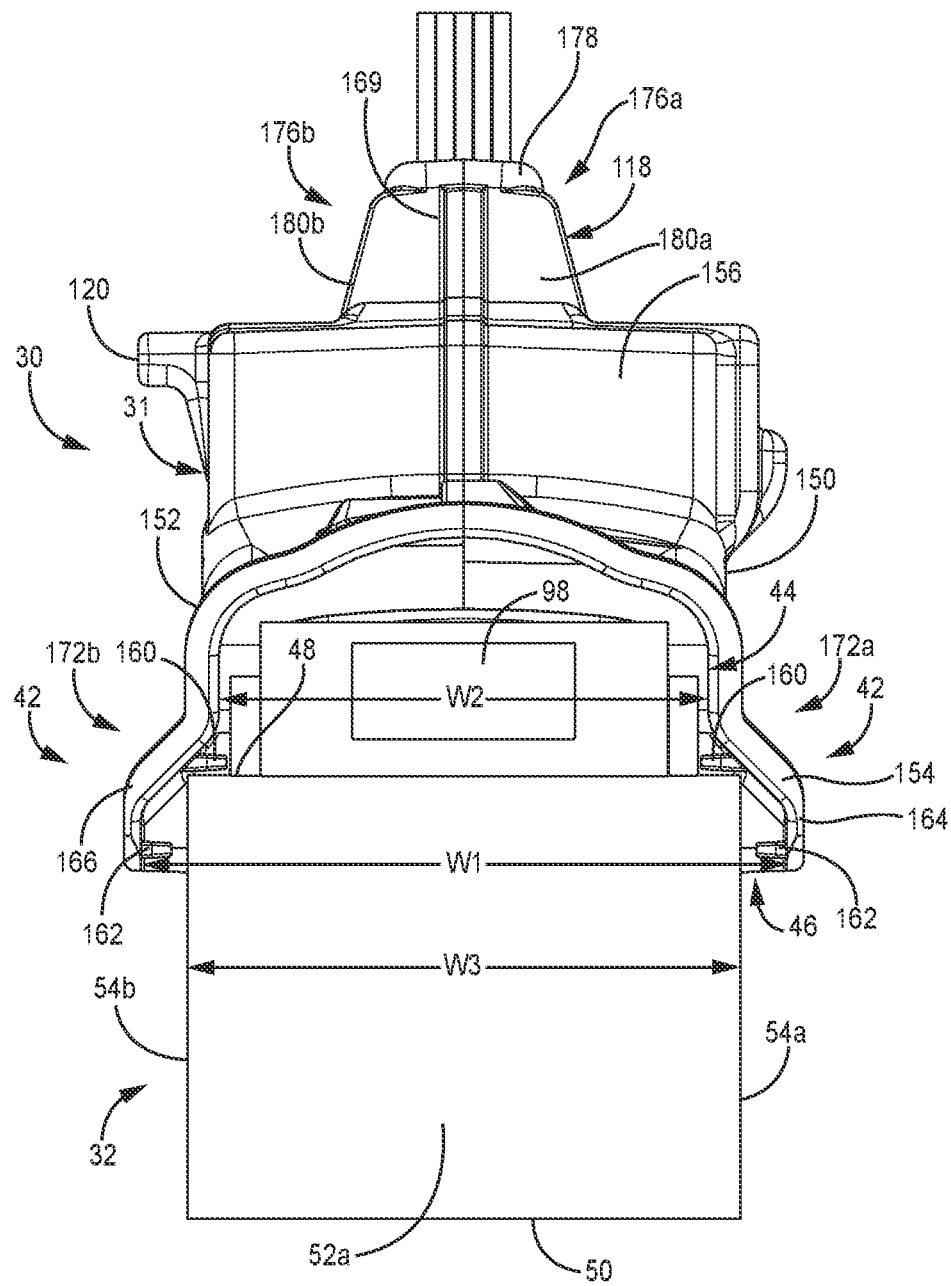
FIG. 5A is a front view of a battery mount and battery.
Figure 5C:
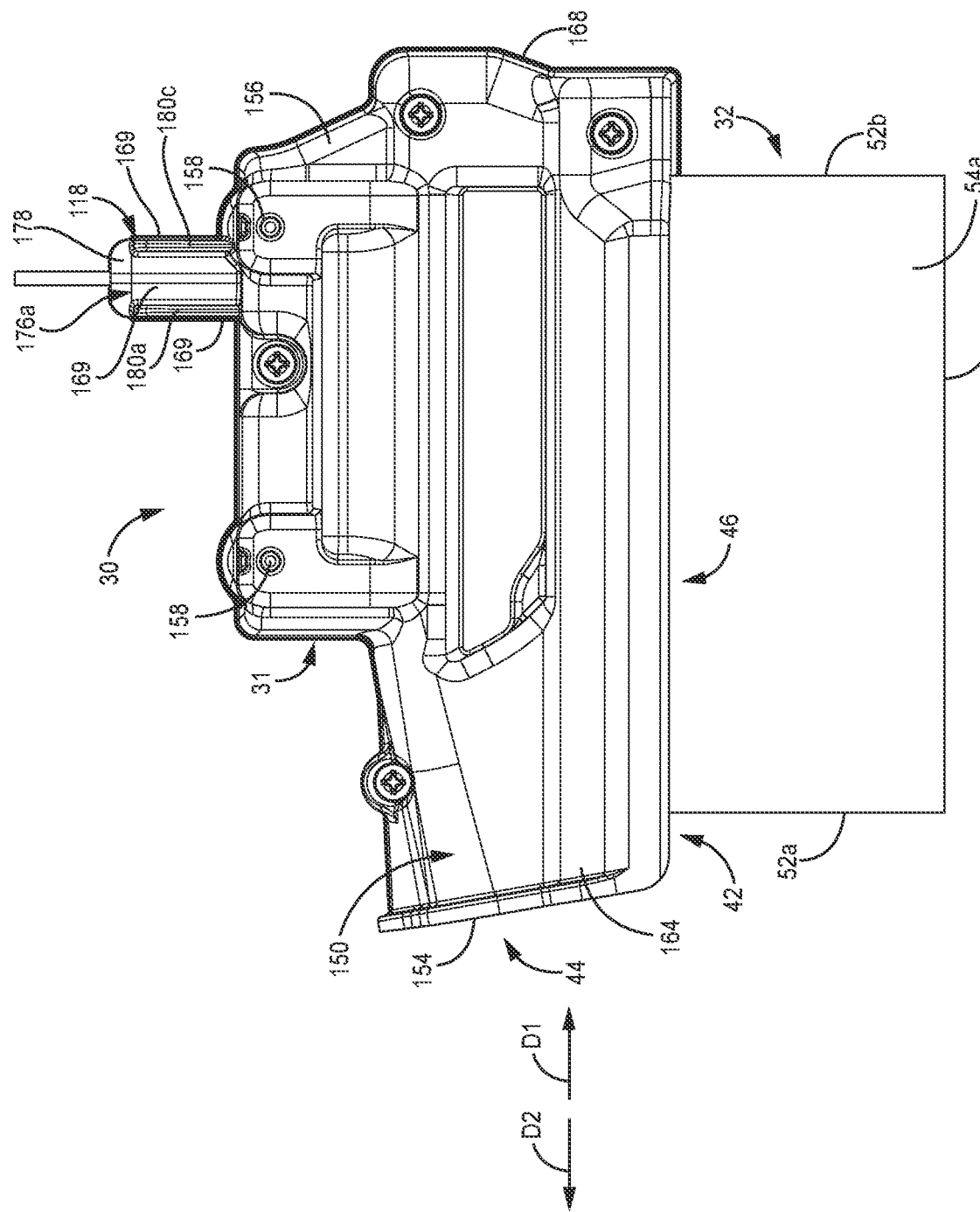
FIG. 5C is a second side elevation view of the battery mount and battery.
Figure 5D:
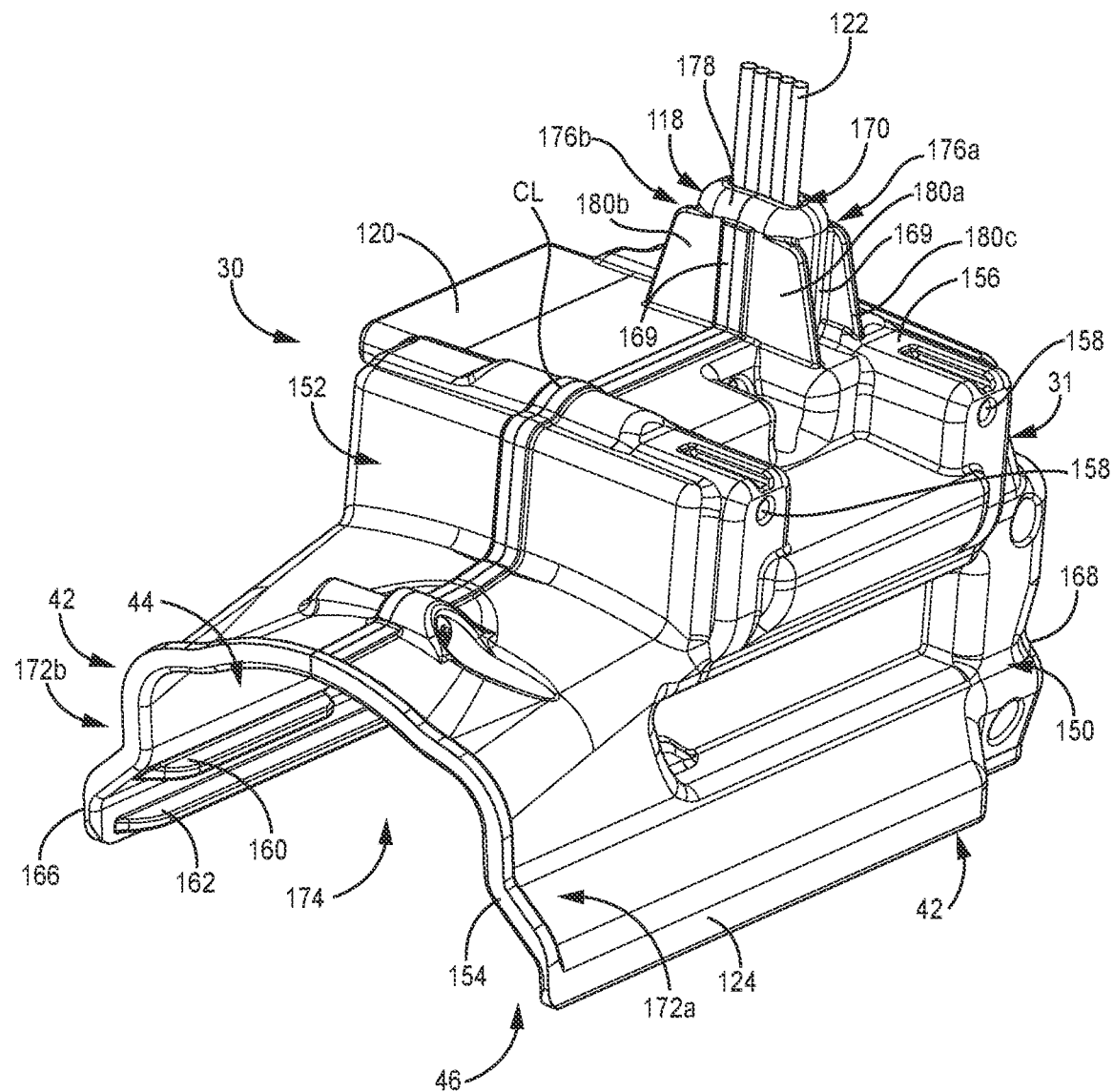
FIG. 5D is a first isometric view of the battery mount.
Figure 5E:
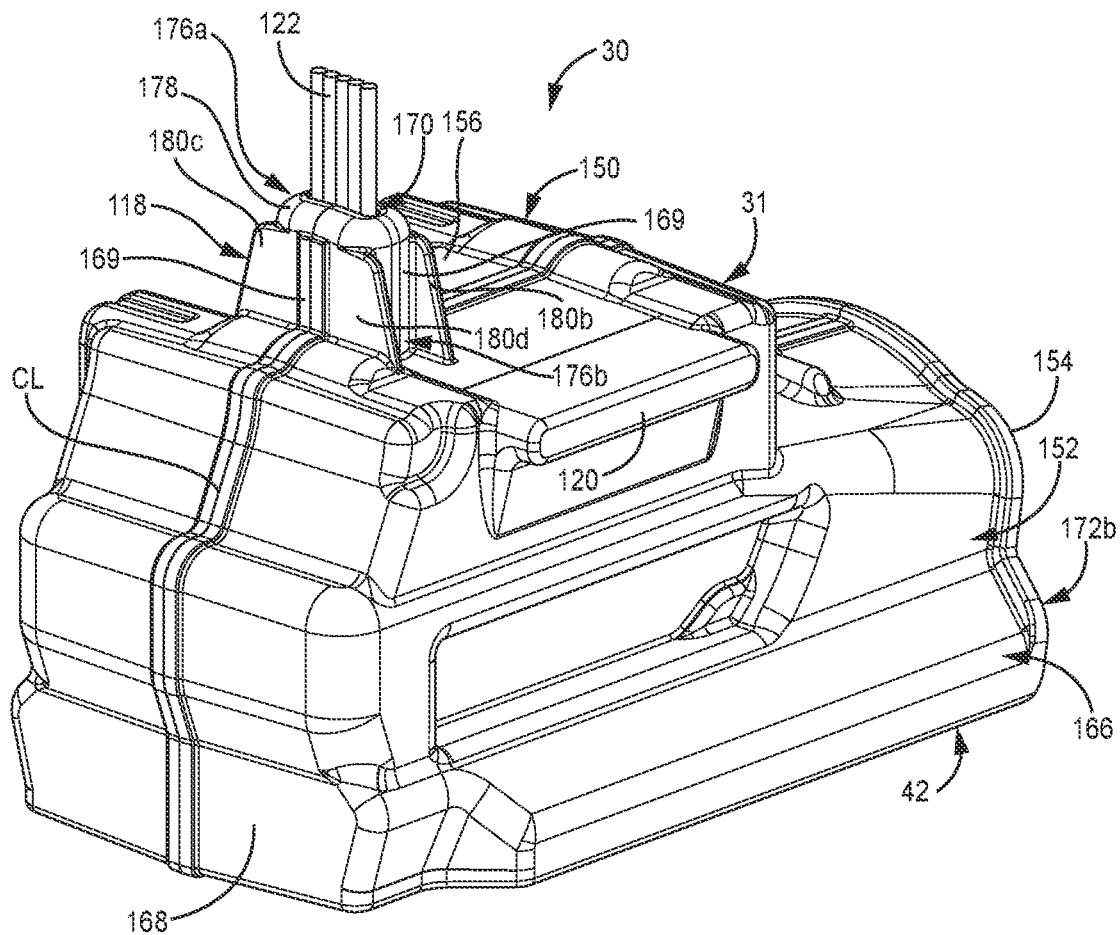
FIG. 5E is a second isometric view of the battery mount.

FIG. 5A is a front view of battery mount 30 and battery 32. FIG. 5B is a first side elevation view of battery mount 30 and battery 32. FIG. 5C is a second side elevation view of battery mount 30 and battery 32. FIG. 5D is a first isometric view of battery mount 30. FIG. 5E is a second isometric view of battery mount 30. FIGS. 5A-5E will be discussed together. Battery mount 30 includes mount body 31, edges 42 defining mounting opening 44 and lower opening 46, chimney 118, projection 120, first lateral portion 150, second lateral portion 152, lip 154, mount block 156, fastener openings 158, upper projections 160, and lower projections 162. Edges 42 define first wing 164, second wing 166, and back side 168. Chimney 118 includes chimney sides 169; wire opening 170; lateral portions 176a, 176b; chimney cap 178; and flanges 180a-180d. Battery 32 includes top 48, bottom 50, longitudinal ends 52a, 52b; lateral sides 54a, 54b; and button 98.

Battery mount 30 is configured to mount to fluid sprayer 12 (FIGS. 1A-4). Battery mount 30 is formed by first lateral portion 150 being connected to second lateral portion 152, such as by fasteners. A fluid tight seal can be formed at the interface between first lateral portion 150 and second lateral portion 152. The body 31 of battery mount 30 is formed by first lateral portion 150 and second lateral portion 152. It is understood, however, that battery mount 30 can be formed in any desired manner. In some examples, battery mount 30 is formed as a unitary component, such as by molding, casting, etc. First lateral portion 150 and second lateral portion 152 define chamber 174 within which battery 32 is mounted. Mount block 156 projects vertically upward away from chamber 174. Chimney 118 extends vertically upward from mount block 156 and is disposed on a longitudinal centerline C (FIG. 5D) of battery mount 30.

Chimney 118 is a vertical projection that defines a pathway for wires to extend from the contacts with battery 32 and out of battery mount 30. Chimney 118 is sealed with the body 31 of battery mount 30 such that fluid cannot leak between chimney 118 and the body 31 of battery mount 30 and into the interior of battery mount 30. In the example shown, chimney 118 is integrally formed with battery mount 30. Similar to battery mount 30, chimney 118 includes two lateral portions 176a, 176b that mate to form chimney 118. Lateral portion 176a can be formed as an integral projection from first lateral portion 150 forming body 31 of battery mount 30. Lateral portion 176b can be formed as an integral projection from second lateral portion 150 forming body 31 of battery mount 30. Chimney 118 can be symmetrical about the centerline CL of battery mount 30. In the example shown, lateral portion 176a is a mirror image of lateral portion 176b, but it is understood that not all examples of chimney 118 are mirrored across the centerline C of battery mount 30. Lateral side 176a mates with lateral side 176b at a sealed interface to prevent any fluid from migrating through the body of chimney 118 and into chimney passage 171 (FIG. 3B).

Chimney sides 169 extend vertically from the top side of battery mount 30 and define the chimney passage 171 through chimney 118. In the example shown, chimney sides 169 define a body that has a rectangular cross-section taken orthogonal to a vertical axis. It is understood, however, that chimney sides 169 can be arranged to have any desired cross-sectional shape relative to the vertical axis.

Flanges 180a-180d extend laterally relative to chimney sides 169. In the example shown, flanges 180a, 180c are formed on lateral side 176a and flanges 180b, 180d are formed on lateral side 176b. Flanges 180a, 180b form a first wing at a front end of chimney 118 and flanges 180c, 180d form a second wing at a rear end of chimney 118. Each flange 180a-180d converges towards the centerline CL from a base of the flange 180a-180d at body 31 to a tip of the flange 180a-180d proximate chimney cap 178. As such, each wing has a narrowing lateral width between a base at mount body 31 and an opposite end of the wing spaced vertically from mount body 31. Chimney cap 176 projects above the top edges of flanges 180a-180d to form the top of chimney 118.

Flanges 180a-180d facilitate installation of battery mount 30. Flanges 180a-180d converge to allow battery mount 30 to swing into the mounting position with projection 120 disposed in the mounting slot 100 (best seen in FIG. 2A) of base plate 96. Flanges 180a-180d can interface with the edges of battery plate 96 defining the chimney opening 114 to prevent undesired rotation of battery mount 30 about a vertical axis. Flanges 180a-180d further structurally support chimney 118 to provide a robust assembly and prevent unintended contact damage to chimney 118.

Chimney cap 178 is formed at the top end of chimney 118 disposed opposite the end of chimney 118 interfacing with body 31 of battery mount 30. Chimney cap 178 is a rounded tip that is formed by a convergence of chimney sides 169. Chimney cap 178 projects above the top ends of flanges 180-180d. Wire opening 170 is a slot formed through chimney cap 178 and through which connectors 122 extend to electrically connect battery 32 to other components of fluid sprayer 12, such as motor 26 (FIGS. 1A, 1B, and 3A). Wire opening 170 is size to tightly interface with connectors 122 at the location where connectors 122 exit from chimney 118. Wire opening 170 is laterally elongate relative to the orientation of battery mount 30. Wire opening 170 is the only opening through chimney 118 exposed on the exterior of battery mount 30. In some examples, a seal, such as a gasket among other options, can be disposed within wire opening 170 between connectors 122 and the edges of chimney cap 176 defining opening 170. The seal prevents fluid from entering into battery mount 30 between connectors 122 and chimney 118 and can prevent contact between connectors 122 and the edges of wire opening 170 formed by chimney 118, protecting against undesired contact damage to connectors 122. It is understood, however, that not all examples are so limited.

Chimney cap 178 is the uppermost portion of battery mount 30 and is the portion of battery mount 30 disposed furthest from battery 30. Wire opening 170 is formed through the portion of chimney 118 spaced furthest from the body 31 of battery mount 30. Wire opening 170 is the uppermost portion of battery mount 30. Chimney 118 extends into sprayer body 20 (as best seen in FIGS. 3A and 3B) such that the chimney 118 is disposed within sprayer body 20 and above the floor formed by bottom side 34 of sprayer body 20. Wire opening 170 being formed through the portion of chimney 118 furthest from body 31 and being the only exterior opening through chimney 118 protects battery 32 and electrical connectors 122 from fluid during operation. Fluid falls down the sides 169 of chimney 118 and away from wire opening 170 due to gravity. Wire opening 170 can be considered to be oriented on an X-Z plane.

Projection 120 extends from mount block 156 and projects laterally beyond an edge of mount block 156. In the example shown, projection 120 is formed as part of second lateral portion 152. Projection 120 is configured to interface with slot 100 to mount battery mount 30 to fluid sprayer 12. Fastener openings 158 are formed in mount block 156. Fastener openings 158 are formed on an opposite lateral side of mount block 156 from projection 120. Fastener openings 158 are formed in first lateral portion 150. Fastener openings 158 are configured to receive fasteners 104 (best seen in FIG. 2A) to mount battery mount 30 to fluid sprayer 12.

First wing 164 extends vertically downward relative to mount block 156. First wing 164 includes a contour 172a. Second wing 166 extends vertically downward relative to mount block 156. Second wing 166 includes a contour 172b. The contours 172a, 172b laterally widen chamber 174 such that mounting opening 44 is wider proximate the lower end of mounting opening 44 than proximate an upper end of mounting opening 44. A width W1 of mounting opening 44 proximate lower opening 46 is larger than a width W2 of mounting opening 44 above contours 172a, 172b. First wing 164 and second wing 166 project outward in the manner of an awning or umbrella to protect battery 32 from spray fluid.

Upper projections 160 are formed on first wing 164 and second wing 166. Upper projections 160 extend into chamber 174. Upper projections 160 are formed as rails that provide stiffening to battery mount 30 and assist in guiding a battery into battery mount 30 during mounting. Lower projections 162 are formed on first wing 164 and second wing 166. More specifically, lower projections 162 are formed on the portions of first wing 164 and second wing 166 disposed below contours 172a, 172b. Lower projections 162 are formed as rails that provide stiffening to battery mount 30 and can assist in guiding a battery into battery mount 30 during mounting. In the example shown, lower projections 162 extend further into chamber 174 and towards back side 168 of battery mount 30 than upper projections 160. Battery mount 30 is configured to accept differently sized batteries. Upper projections 160 assist with mounting of relatively smaller sized batteries while lower projections 162 assist with mounting of relatively larger sized batteries. The widening between first wing 164 and second wing 166 facilitates the mounting of various battery sizes while maintaining gaps between battery mount 30 and battery 32.

Battery 32 is inserted into and removed from chamber 174 though mounting opening 44. Mounting opening 44 is a side opening of battery mount 30, rather than a top or bottom opening. Chamber 174 further includes lower opening 46 through which a portion of battery 32 extends with battery 32 mounted to battery mount 30. Lip 154 defines mounting opening 44 and is at least partially formed by first wing 164 and second wing 166. As best seen in FIGS. 5B and 5C, lip 154 extends further forward at the vertical top of lip 154 than at the distal ends of lip 154, located at the location where mounting opening 44 transitions to lower opening 46. As shown, battery mount 30 has a length L3 proximate the transition between mounting opening 44 and lower opening 46 and battery mount 30 has a length L1 proximate the top of lip 154. Lengths L1 and L3 are larger than length L2 of battery 32. Length L1 is larger than length L3 such that the portion of battery mount 30 defining mounting opening 44 extends outward relative to battery 32 to cover battery 32 similar to an umbrella or awning. Lip 154 is canted forward to extend further longitudinally relative to battery 32 and provide additional coverage to battery 32 to prevent fluid from falling onto battery 32 or button 98.

Battery 32 is slidably mounted to battery mount 30. Battery 32 is configured to slide in direction D1 to mount to battery mount 30 and is configured to slide in direction D2 to dismount from battery mount 30. Linear sliding secures or releases battery 32 from battery mount 30. With battery 32 mounted to battery mount 30, top 48 is fully disposed within chamber 174 and overlapped by battery mount 30.

With battery 32 mounted to battery mount 30, battery 32 is partially disposed within chamber 174 and partially outside of chamber 174. Battery 32 projects out of chamber 174 through lower opening 46. Battery 32 hangs from battery mount 30 through lower opening 46. Each of longitudinal ends 52a, 52b and lateral sides 54a, 54b are partially disposed within chamber 174 and extend out of chamber 174 through lower opening 46. In the example shown, battery bottom 50 is not disposed within chamber 174. Bottom 50 is disposed fully outside of chamber 174 such that bottom 50 is not overlapped or obscured by any portion of battery mount 30. The portions of battery mount 30 defining lower opening 46 (e.g., edges 42) are disposed vertically between top 48 and bottom 50 of battery 32.

Lateral side 54a is spaced from an opposing one of edges 42. Lateral side 54a does not contact first lateral portion 150. An air gap is formed between lateral side 54a and first wing 164. Lateral side 54a does not contact either of upper projection 160 or lower projection 162 when battery 32 is mounted to battery mount 30. Lateral side 54b is spaced from an opposing edge 42. Lateral side 54b does not contact second lateral portion 152. An air gap is formed between Lateral side 54b and second wing 166. Lateral side 54b does not contact either of upper projection 160 or lower projection 162 when battery 32 is mounted to battery mount 30. A width W3 of battery 32 is smaller than width W1 and larger than width W2; however, neither lateral side 54a, 54b contacts any portion of battery mount 30. In some examples, longitudinal end 52b is spaced from battery mount 30 such that an air gap is formed between longitudinal end 52b and battery mount 30. As such, battery 32 can be mounted to battery mount 30 such that only top 48 contacts battery mount 30 while each of longitudinal ends 52a, 52b; lateral sides 54a, 54b; and bottom 50 do not contact battery mount 30. The air gaps formed between battery 32 and battery mount 30 facilitate airflow into chamber 174 between battery 32 and battery mount 30, enhancing cooling of battery 32.

The mounting arrangement between battery mount 30 and battery 32 provides significant advantages. The edges of battery mount 30 project beyond the sides of battery 32 to protect battery 32 from falling fluid particles. Air gaps are formed between battery 32 and battery mount 30 to facilitate cooling of battery 32. Battery 32 projects through lower opening 46 of battery mount 30 to expose portions of battery 32 and further facilitate cooling. The wider battery mount 30 relative to battery 32 provides protection from falling fluid particles to those exposed portions of battery 32 that project below the lower opening 46. Chimney 118 provides significant advantages. Chimney 118 and battery mount 30 have a sealed interface (e.g., by chimney 118 being contiguous with mount body 31) that prevents any fluid migration into the interior of battery mount 30 between chimney 118 and mount body 31. Chimney 118 projects vertically from battery mount 30 away from the chamber that battery 32 is disposed within. Chimney 118 extends into sprayer body 20 such that wire opening 170 is disposed within sprayer body 20 and protected from fluid particles by the sprayer body 20. Flanges 180a-180d provide a structurally robust chimney 118 that further protects connectors 122. As such, chimney 118 protects connectors 122 from both mechanical and fluid damage.

Discussion of Non-Exclusive Embodiments

The following are non-exclusive descriptions of possible embodiments of the present invention.

A fluid sprayer includes a sprayer body; an electric motor located within the sprayer body; a piston pump operated by the electric motor to spray fluid; a stand supporting the sprayer body, the stand comprising at least two legs, the stand extending vertically below the sprayer body; and a battery mount holding a battery configured to provide power to the electric motor to power pumping by the pump. The battery mount is disposed vertically below the sprayer body and the battery mount positions the battery such that the battery is disposed vertically between an interface between the stand and the sprayer body and a ground interface of the stand when mounted to the battery mount.

The fluid sprayer of the preceding paragraph can optionally include, additionally and/or alternatively, any one or more of the following features, configurations and/or additional components:

The battery is disposed laterally between a first leg of the at least two legs and a second leg of the at least two legs.

The battery is disposed within an area bounded by the at least two legs.

The stand includes a first leg of the at least two legs having a curve between a vertically extending portion of the first leg and a horizontally extending portion of the first leg, and wherein the battery is framed by the curve of the first leg.

The battery is connected to the battery mount by a portion of the battery disposed in a slot of the battery mount.

The battery mount includes a mounting opening through which the battery can be mounted to the battery mount and dismounted from the battery mount.

The mounting opening is a side opening of the battery mount, and wherein the battery is slidably mountable to the battery mount through the side opening.

The battery does not slide towards a front of the fluid sprayer during dismounting.

The battery does not slide towards the pump during dismounting.

The mounting opening is a side opening of the battery mount, and wherein the battery projects through a lower opening of the battery mount.

A front side of the battery is exposed through the mounting opening, and wherein each of a first lateral side of the battery, a second lateral side of the battery, and a rear side of the battery are at least partially covered by the battery mount.

The battery mount includes plurality of awning portions that extend outward relative to a front side of the battery, a rear side of the battery, a left side of the battery, and a right side of the battery to protect the battery from falling spray fluid.

The front side, the left side, and the right side of the battery remain exposed below the battery mount during spray operation of the fluid sprayer.

The battery hangs from the battery mount such that a bottom side of the battery is exposed during spray operation of the fluid sprayer.

The battery hangs from a plurality of rails of the battery mount on which the battery can slide during installation of the battery.

The battery mount has a first width and a first length; the battery has a second width and a second length; the first width is larger than the second width; and the first length is larger than the second length.

A footprint of the battery mount has a first area, a footprint of the battery has a second area, and the first area is larger than the second area.

The battery mount includes a first lateral wing and a second lateral wing, and wherein the battery is connected to the battery mount such that the battery is disposed directly between the first lateral wing and the second lateral wing.

A distal end of the first lateral wing is spaced from and does not contact the battery, and wherein a distal end of the second lateral wing is spaced from and does not contact the battery.

The battery mount includes a chimney extending from a top side of the battery mount and extending into the sprayer body, wherein wires extend through the chimney into the sprayer body.

The stand includes a base plate supporting the battery mount, and wherein the chimney extends through the base plate.

The sprayer body is connected to the base plate such that the base plate is disposed directly between the sprayer body and the battery mount.

The battery mount includes a first lateral portion connected to a second lateral portion, and wherein the first lateral portion and the second lateral portion define a mounting slot within which the battery is disposed.

The battery mount is attached to the sprayer body by a projection extending from the first lateral side and interfacing with a slot formed in the sprayer body and by fasteners extending into the second lateral side.

A handle extending from the sprayer body and laterally offset from a pump reciprocation axis. A center of gravity of the fluid sprayer extends through the handle and through the battery mount.

Controls are disposed on a first lateral side of the sprayer body and wherein the battery is mountable to the fluid sprayer through an opening disposed directly below the first lateral side.

A fluid sprayer includes a sprayer body; an electric motor located within the sprayer body; a piston pump operated by the electric motor to spray fluid; a stand supporting the sprayer body, the stand comprising a plurality of legs, the stand extending vertically below the sprayer body; and a battery mount holding a battery configured to provide power to the electric motor to power pumping by the pump. A first leg of the plurality of legs includes a curve between a vertically extending portion of the first leg and a horizontally extending portion of the first leg, and wherein the battery is framed by the curve of the first leg.

The fluid sprayer of the preceding paragraph can optionally include, additionally and/or alternatively, any one or more of the following features, configurations and/or additional components:

The battery mount is disposed vertically between the battery and the sprayer body.

A fluid sprayer includes a sprayer body; an electric motor located within the sprayer body; a piston pump operated by the electric motor to spray fluid; a stand supporting the sprayer body, the stand comprising at least two legs, the stand extending vertically below the sprayer body; and a battery mount holding a battery configured to provide power to the electric motor to power pumping by the pump. The battery mount is disposed vertically below the sprayer body. The battery mount positions the battery such that the battery is disposed laterally between the at least two legs.

The fluid sprayer of the preceding paragraph can optionally include, additionally and/or alternatively, any one or more of the following features, configurations and/or additional components:

The battery is disposed laterally between a first leg of the at least two legs and a second leg of the at least two legs.

The battery is disposed within an area bounded by the at least two legs.

The stand includes a first leg of the at least two legs having a curve between a vertically extending portion of the first leg and a horizontally extending portion of the first leg, and wherein the battery is framed by the curve of the first leg.

The battery is connected to the battery mount by a portion of the battery disposed in a slot of the battery mount.

The battery mount includes a mounting opening through which the battery can be mounted to the battery mount and dismounted from the battery mount.

The mounting opening is a side opening of the battery mount, and wherein the battery is slidably mountable to the battery mount through the side opening.

The battery does not slide towards a front of the fluid sprayer during dismounting.

The battery does not slide towards the pump during dismounting.

The mounting opening is a side opening of the battery mount, and wherein the battery projects through a lower opening of the battery mount.

A front side of the battery is exposed through the mounting opening, and wherein each of a first lateral side of the battery, a second lateral side of the battery, and a rear side of the battery are at least partially covered by the battery mount.

The battery mount includes plurality of awning portions that extend outward relative to a front side of the battery, a rear side of the battery, a left side of the battery, and a right side of the battery to protect the battery from falling spray fluid.

The front side, the left side, and the right side of the battery remain exposed below the battery mount during spray operation of the fluid sprayer.

The battery hangs from the battery mount such that a bottom side of the battery is exposed during spray operation of the fluid sprayer.

The battery hangs from a plurality of rails of the battery mount on which the battery can slide during installation of the battery.

The battery mount has a first width and a first length; the battery has a second width and a second length; the first width is larger than the second width; and the first length is larger than the second length.

A footprint of the battery mount has a first area, a footprint of the battery has a second area, and the first area is larger than the second area.

The battery mount includes a first lateral wing and a second lateral wing, and wherein the battery is connected to the battery mount such that the battery is disposed directly between the first lateral wing and the second lateral wing.

A distal end of the first lateral wing is spaced from and does not contact the battery, and wherein a distal end of the second lateral wing is spaced from and does not contact the battery.

A fluid sprayer includes a sprayer body; an electric motor located within the sprayer body; a piston pump operated by the electric motor to spray fluid; a stand supporting the sprayer body, the stand comprising at least two legs, the stand extending vertically below the sprayer body; and a battery mount holding a battery configured to provide power to the electric motor to power pumping by the pump. The battery mount is disposed vertically below the sprayer body. The battery mount includes a chimney extending from a top side of the battery mount and into the sprayer body. Wires extend through the chimney into the sprayer body.

The fluid sprayer of the preceding paragraph can optionally include, additionally and/or alternatively, any one or more of the following features, configurations and/or additional components:

The sprayer body comprises an interior floor, the chimney extends through an aperture in the interior floor, and an opening in the chimney from which the wires emerge into an interior of the sprayer body from the chimney is positioned above the interior floor.

The stand includes a base plate supporting the battery mount, and wherein the chimney extends through the base plate.

The sprayer body is connected to the base plate such that the base plate is disposed directly between the sprayer body and the battery mount.

The battery mount includes a first lateral portion connected to a second lateral portion, and wherein the first lateral portion and the second lateral portion define a mounting slot within which the battery is disposed.

The battery mount is attached to the sprayer body by a projection extending from the first lateral side and interfacing with a slot formed in the sprayer body and by fasteners extending into the second lateral side.

A battery mount for a fluid sprayer includes a mount body having a plurality of edges defining a receiving chamber, the receiving chamber having a front opening through which a battery enters into and exits from the receiving chamber to mount to and dismount from the battery mount, and defining a lower opening through which a portion of the battery projects when mounted to the battery mount; and a chimney extending from a top side of the mount body and away from the lower opening, the chimney including a wire opening disposed at a top end of the chimney opposite an end of the chimney interfacing with the mount body, and the chimney defining a wire passage between the end of the chimney interfacing with the mount body and the top end.

The battery mount of the preceding paragraph can optionally include, additionally and/or alternatively, any one or more of the following features, configurations and/or additional components:

The chimney includes a plurality of walls extending from the mount body and a disposed at the top end, wherein the wire opening is formed through the cap.

The chimney includes at least one flange.

The at least one flange extends laterally relative to a mounting direction of the battery.

The chimney has a rectangular cross-section taken orthogonal to an axis through the wire passage.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fluid sprayer comprising:
  a sprayer body having a front end, a rear end spaced from the front end, a top side between the front end and the rear end, a bottom side between the front end and the rear end, a first lateral side between the front end and the rear end, and a second lateral side between the front end and the rear end;
  an electric motor located within the sprayer body;
  a piston pump operated by the electric motor to spray fluid, the piston pump disposed at the front end of the sprayer body, the piston pump configured to be at least partially outside of the sprayer body to draw spray fluid from a reservoir and the piston pump configured to output the spray fluid to a spray gun via a hose;
  a stand supporting the sprayer body, the stand comprising at least two legs, the stand extending vertically below the sprayer body; and
  a battery mount supported by the sprayer body and disposed between the front end and the rear end of the sprayer body, the battery mount configured to hold a battery configured to provide power to the electric motor to power pumping by the pump, the battery mount hanging from the bottom side of the spray body and disposed vertically below the sprayer body such that the battery mount is between the rear end of the sprayer body and the piston pump, and the battery mount positioning the battery such that the battery is disposed vertically between an interface between the stand and the sprayer body and a ground interface of the stand when the battery is mounted to the battery mount, the battery mount configured such that the battery is removably mountable to the battery mount.

2. The fluid sprayer of claim 1, wherein the battery is disposed laterally between a first leg of the at least two legs and a second leg of the at least two legs.

3. The fluid sprayer of claim 1, wherein the battery is disposed within an area bounded by the at least two legs.

4. The fluid sprayer of claim 1, wherein the stand includes a first leg of the at least two legs having a curve between a vertically extending portion of the first leg and a horizontally extending portion of the first leg, and wherein the battery is framed by the curve of the first leg.

5. The fluid sprayer of claim 1, wherein the battery is connected to the battery mount by a portion of the battery disposed in a slot of the battery mount.

6. The fluid sprayer of claim 5, wherein the battery mount includes a mounting opening through which the battery can be mounted to the battery mount and dismounted from the battery mount.

7. The fluid sprayer of claim 6, wherein:
the mounting opening is a side opening of the battery mount;
the battery is slidably mountable to the battery mount through the side opening; and
the battery does not slide towards at least one of the front end of the sprayer body and the pump during dismounting.

8. The fluid sprayer of claim 6, wherein the mounting opening is a vertical opening through a side of the battery mount, and wherein the battery projects through a lower opening of the battery mount.

9. The fluid sprayer of claim 8, wherein a front side of the battery is exposed through the mounting opening, and wherein each of a first lateral side of the battery, a second lateral side of the battery, and a rear side of the battery are at least partially vertically covered by the battery mount.

10. The fluid sprayer of claim 1, wherein the battery mount includes plurality of awning portions that extend outward relative to a front side of the battery, a rear side of the battery, a left side of the battery, and a right side of the battery to protect the battery from falling spray fluid.

11. The fluid sprayer of claim 10, wherein the front side of the battery, the left side of the battery, and the right side of the battery remain exposed below the battery mount with the battery mounted to the battery mount and during spray operation of the fluid sprayer.

12. The fluid sprayer of claim 1, wherein the battery hangs from the battery mount such that a bottom side of the battery is exposed during spray operation of the fluid sprayer.

13. The fluid sprayer of claim 12, wherein the battery hangs from a plurality of rails of the battery mount on which the battery can slide during installation of the battery.

14. The fluid sprayer of claim 1, wherein a footprint of the battery mount has a first area, a footprint of the battery has a second area, and the first area is larger than the second area.

15. The fluid sprayer of claim 1, wherein the battery mount includes a first lateral wing and a second lateral wing, and wherein the battery is connected to the battery mount such that the battery is disposed directly between the first lateral wing and the second lateral wing.

16. The fluid sprayer of claim 15, wherein a distal end of the first lateral wing is spaced from and does not contact the battery, and wherein a distal end of the second lateral wing is spaced from and does not contact the battery.

17. The fluid sprayer of claim 1, wherein the battery mount includes a chimney extending from a top side of the battery mount and extending into the sprayer body, wherein wires extend through the chimney into the sprayer body.

18. The fluid sprayer of claim 17, wherein the stand includes a base plate supporting the battery mount, and wherein the chimney extends through the base plate.

19. The fluid sprayer of claim 18, wherein the sprayer body is connected to the base plate such that the base plate is disposed directly between the sprayer body and the battery mount.

20. A fluid sprayer comprising:
a sprayer body;
an electric motor located within the sprayer body;
a piston pump operated by the electric motor to spray fluid;
a stand supporting the sprayer body, the stand comprising at least two legs, the stand extending vertically below the sprayer body;
a battery mount holding a battery configured to provide power to the electric motor to power pumping by the pump, the battery mount disposed vertically below the sprayer body, the battery mount comprising a chimney extending from a top side of the battery mount and extending into the sprayer body such that the chimney extends into an interior space of the sprayer body, wherein wires extend out of the battery mount through the chimney and into the sprayer body.

21. The fluid sprayer of claim 20, wherein the sprayer body comprises an interior floor, the chimney extends through an aperture in the interior floor, and an opening in the chimney from which the wires emerge into an interior of the sprayer body from the chimney is positioned above the interior floor.

22. A fluid sprayer comprising:
a sprayer body;
an electric motor located within the sprayer body;
a piston pump operated by the electric motor to spray fluid;
a stand supporting the sprayer body, the stand comprising at least two legs, the stand extending vertically below the sprayer body; and
a battery mount, the battery mount configured to hold a battery configured to provide power to the electric motor to power pumping by the pump, the battery mount hanging from the sprayer body and disposed vertically below the sprayer body such that the battery mount is between a rear end of the sprayer body and the piston pump, and the battery mount positioning the battery such that the battery is disposed vertically between an interface between the stand and the sprayer body and a ground interface of the stand when the battery is mounted to the battery mount;
wherein the battery mount includes a plurality of awning portions that extend outward relative to a plurality of sides of the battery to protect the battery from falling spray fluid, and wherein an air gap is formed directly between interior sides of the plurality of awning portions and multiple sides of the plurality of sides, the interior sides of the plurality of awning portions facing towards an interior area of the battery mount within which the battery is configured to mount, and the plurality of awning portions further including exterior sides facing away from the interior area of the battery mount, and the battery mount includes a lower opening and a mounting opening;

wherein the battery mount is configured such that the battery is removably mountable to the battery mount and the battery mount is configured such that the battery enters into and exits from the battery mount through the mounting opening during mounting and dismounting and such that the battery hangs through and slides within the lower opening during mounting and dismounting.

23. A fluid sprayer comprising:

a sprayer body;

an electric motor located within the sprayer body;

a piston pump operated by the electric motor to spray fluid, the piston pump disposed at a front end of the sprayer body;

a stand supporting the sprayer body, the stand comprising at least two legs and a base plate, the stand extending vertically below the sprayer body; and a battery mount disposed between a front end and a rear end of the sprayer body, the battery mount configured to hold a battery configured to provide power to the electric motor to power pumping by the pump, the battery mount disposed vertically below the sprayer body, and the battery mount positioning the battery such that the battery is disposed vertically between an interface between the stand and the sprayer body and a ground interface of the stand when the battery is mounted to the battery mount, the battery mount configured such that the battery is removably mountable to the battery mount and such that the battery shifts laterally relative to the sprayer body during mounting to the battery mount and dismounting from the battery mount;

wherein the sprayer body is disposed on a top side of the base plate and the battery mount is supported by the base plate and disposed on an opposite side of the base plate from the sprayer body such that the battery mount is below the base plate and such that the battery mount hangs down to be positioned laterally between the at least two legs.

* * * * *